(12) United States Patent
Trefzger et al.

(10) Patent No.: US 8,901,033 B2
(45) Date of Patent: Dec. 2, 2014

(54) CATALYST COMPOSITIONS AND APPLICATIONS THEREOF

(75) Inventors: Christian Trefzger, Durham, NC (US); Chris E DiFrancesco, Durham, NC (US); Raymond H. Oh, Durham, NC (US)

(73) Assignee: Cormetech, Inc., Durham, NC (US)

( * ) Notice: Subject to any disclaimer, the term of this patent is extended or adjusted under 35 U.S.C. 154(b) by 479 days.

(21) Appl. No.: 13/206,497

(22) Filed: Aug. 9, 2011

(65) Prior Publication Data

US 2012/0087835 A1  Apr. 12, 2012

Related U.S. Application Data

(60) Provisional application No. 61/371,971, filed on Aug. 9, 2010, provisional application No. 61/371,948, filed on Aug. 9, 2010.

(51) Int. Cl.
*B01J 23/00* (2006.01)
*B01J 23/22* (2006.01)
(Continued)

(52) U.S. Cl.
CPC ........ *B01D 53/8665* (2013.01); *B01D 53/8609* (2013.01); *B01D 53/8634* (2013.01); *B01D 53/9418* (2013.01); *B01J 21/063* (2013.01); *B01J 23/22* (2013.01); *B01J 23/30* (2013.01); *B01J 35/0006* (2013.01); *B01J 35/0073* (2013.01); *B01J 35/04* (2013.01); *B01J 37/0201* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/104* (2013.01); *B01D 2255/106* (2013.01); *B01D 2255/20723* (2013.01); *B01D 2255/20769* (2013.01); *B01D 2255/20776* (2013.01); *B01D 2255/905* (2013.01); *B01D 2257/302* (2013.01);

*B01D 2257/404* (2013.01); *B01D 2257/406* (2013.01); *B01D 2257/602* (2013.01)
USPC ........... 502/439; 502/305; 502/312; 502/313; 502/321; 502/325; 502/353

(58) Field of Classification Search
CPC .................................................. B01D 2255/905
See application file for complete search history.

(56) References Cited

U.S. PATENT DOCUMENTS 4,335,023 A * 6/1982 Dettling et al. ............... 502/262
4,407,733 A   10/1983 Birkenstock et al.
(Continued)

FOREIGN PATENT DOCUMENTS

EP    0766993 A2    4/1997
EP    1543876 A1    6/2005
(Continued)

OTHER PUBLICATIONS

Partial International Search for PCT/US2011/047146 dated Dec. 23, 2011 (2 pgs).

(Continued)

*Primary Examiner* — Melvin C Mayes
*Assistant Examiner* — Colin W Slifka
(74) *Attorney, Agent, or Firm* — J. Clinton Wimbish; Smith Moore Leatherwood LLP

(57) ABSTRACT

In one aspect, structural catalyst bodies comprising one or more gradients of catalytic material are provided herein. In some embodiments, a structural catalyst body described herein comprises an inner partition wall having a first surface and a second surface opposite the first surface, the inner partition wall having a gradient of catalytic material along the width of the inner partition wall.

43 Claims, 6 Drawing Sheets

(51) Int. Cl.
*B01J 23/24* (2006.01)
*B01J 23/28* (2006.01)
*B01J 23/30* (2006.01)
*B01J 35/04* (2006.01)
*B01D 53/86* (2006.01)
*B01D 53/94* (2006.01)
*B01J 21/06* (2006.01)
*B01J 35/00* (2006.01)
*B01J 37/02* (2006.01)

(56) References Cited

U.S. PATENT DOCUMENTS

| | | | |
|---|---|---|---|
| 4,977,127 | A | 12/1990 | Rikimaru et al. |
| 8,153,542 | B2 | 4/2012 | Bruggendick et al. |
| 2001/0003116 | A1 | 6/2001 | Neufert |
| 2002/0042344 | A1 | 4/2002 | Kondo et al. |
| 2003/0231997 | A1* | 12/2003 | Kettenbauer ............ 423/239.1 |
| 2004/0166035 | A1* | 8/2004 | Noda et al. ............ 422/180 |
| 2006/0008396 | A1 | 1/2006 | Wursthorn et al. |
| 2009/0209417 | A1 | 8/2009 | Bruggendick et al. |
| 2009/0239735 | A1 | 9/2009 | Bruggendick et al. |
| 2009/0291836 | A1 | 11/2009 | Ohno et al. |
| 2009/0305874 | A1 | 12/2009 | Pfeifer et al. |

FOREIGN PATENT DOCUMENTS

| | | |
|---|---|---|
| EP | 01598111 A1 | 11/2005 |
| EP | 1977818 A1 | 10/2008 |
| GB | 1283737 | 8/1972 |
| GB | 2275624 A | 9/1994 |
| WO | 96/16737 | 6/1996 |
| WO | 99/12642 | 3/1999 |

OTHER PUBLICATIONS

International Search Report for PCT/US2011/047146 dated May 4, 2012 (6 pgs).

Communication and Third-Party Observation for PCT/US2011/047146 mailed Nov. 28, 2012.

* cited by examiner

| Structural Catalyst Body Example | Gradient First Catalytic Material Width of First Surface of Inner Partition Wall(s) | Gradient Second Catalytic Material Width of First Surface of Inner Partition Wall(s) | Gradient First Catalytic Material Width of Second Surface of Inner Partition Wall(s) | Gradient Second Catalytic Material Width of Second Surface of Inner Partition Wall(s) | Gradient of Bulk First Catalytic Material Width of Inner Partition Wall(s) | Gradient of Bulk Second Catalytic Material Width of Inner Partition Wall(s) | Gradient First Catalytic Material Length of First Surface of Inner Partition Wall(s) | Gradient Second Catalytic Material Length of First Surface of Inner Partition Wall(s) | Gradient First Catalytic Material Length of Inner Partition Wall(s) | Gradient Second Catalytic Material Length of Inner Partition Wall(s) | Gradient of Bulk First Catalytic Material Length of Inner Partition Wall(s) | Gradient of Bulk Second Catalytic Material Length of Inner Partition Wall(s) | Gradient of Bulk First Catalytic Material between Center-post and Inner Partition Wall(s) | Gradient of Bulk Second Catalytic Material between Center-post and Inner Partition Wall(s) |
|---|---|---|---|---|---|---|---|---|---|---|---|---|---|---|
| 1 | X | | | | | | | | | | | | | |
| 2 | X | X | | | | | | | | | | | | |
| 3 | X | X | X | | | | | | | | | | | |
| 4 | X | X | X | X | | | | | | | | | | |
| 5 | X | X | X | X | X | | | | | | | | | |
| 6 | X | X | X | X | X | X | | | | | | | | |
| 7 | X | X | X | X | X | X | X | | | | | | | |
| 8 | X | X | X | X | X | X | X | X | | | | | | |
| 9 | X | X | X | X | X | X | X | X | X | | | | | |
| 10 | X | X | X | X | X | X | X | X | X | X | | | | |
| 11 | X | X | X | X | X | X | X | X | X | X | X | | | |
| 12 | X | X | X | X | X | X | X | X | X | X | X | X | | |
| 13 | X | X | X | X | X | X | X | X | X | X | X | X | X | |
| 14 | X | X | X | X | X | X | X | X | X | X | X | X | X | X |

Table 1 – Structural catalyst bodies having various gradient constructions

FIGURE 5

CATALYST COMPOSITIONS AND APPLICATIONS THEREOF

RELATED APPLICATION DATA

The present application hereby claims priority to U.S. Provisional Patent Application Ser. No. 61/371,971, filed Aug. 9, 2010 and to U.S. Provisional Patent Application Ser. No. 61/371,948, filed Aug. 9, 2010, each of which is incorporated herein by reference in its entirety.

FIELD

The present invention relates to catalyst compositions and, in particular, to catalyst structures for use in industrial or commercial applications.

BACKGROUND

The role nitrogen oxides in the formation of acid rain, tropospheric ozone and other environmental hazards has resulted in the imposition of strict standards limiting the discharges of these chemical species. To meet these standards, it is generally necessary to remove at least part of these oxides present in the exhaust gases from stationary or mobile combustion sources.

Denitration or selective catalytic reduction (SCR) technology is commonly applied to combustion-derived flue gases for removal of nitrogen oxides. The denitration reaction comprises the reaction of nitrogen oxide species in the gases, such as nitrogen oxide (NO) or nitrogen dioxide ($NO_2$), with a nitrogen containing reductant, such as ammonia or urea, resulting in the production of diatomic nitrogen ($N_2$) and water.

In addition to nitrogen oxides, sulfur dioxide ($SO_2$) is a chemical species often present in combustion-flue gases that causes environmental concern. Sulfur dioxide present in fossil fuel combustion flue-gases is partly oxidized to sulfur trioxide ($SO_3$) which reacts with water to form sulfuric acid. The formation of sulfuric acid from the oxidation of sulfur dioxide in combustion flue-gases can increase corrosion problems in downstream equipment, can increase power costs associated with air pre-heaters due to the increased temperature required to keep the acid-containing flue-gas above its dew point, and can cause increased opacity in the stack gases emitted to the atmosphere.

Catalyst systems for the removal of nitrogen oxides can increase the amount of sulfur dioxide oxidation since catalytic material utilized in selective catalytic reduction can additionally effectuate the oxidation of sulfur dioxide. As a result, the reduction in the nitrogen oxide content of a combustion flue-gas can have an undesirable side-effect of increasing $SO_3$ formation in the combustion flue-gas.

SUMMARY

In one aspect, catalyst bodies are described herein which, in some embodiments, display heterogeneous distributions of catalytic material. In some embodiments, catalyst bodies described herein are operable for the selective catalytic reduction of nitrogen oxides in a flue gas stream. Structural catalyst bodies described herein, in some embodiments, can reduce $SO_2$ oxidation during nitrogen oxide removal from a flue gas stream.

In some embodiments, a structural catalyst body described herein comprises at least one inner partition wall comprising first surface and a second surface opposite the first surface, the inner partition wall having a gradient of a first catalytic material along a width of the first surface. In some embodiments, the first catalytic material of the gradient decreases in amount at the periphery of the width of the first surface. In some embodiments, the first catalytic material of the gradient increases in amount along a central region of the width of the first surface. In some embodiments, a gradient of a first catalytic material along the width of the first surface of the inner partition wall has a profile symmetrical or substantially symmetrical about the midpoint of the profile.

A structural catalyst body, in some embodiments, further comprises a gradient of the first catalytic material along a width of the second surface. In some embodiments, the first catalytic material of the gradient decreases in amount at the periphery of the width of the second surface. The first catalytic material of the gradient, in some embodiments, increases in amount along a central region of the width of the second surface. In some embodiments, the gradient profile of the first catalytic material along the width of the second surface is symmetrical or substantially symmetrical to the gradient profile of the first catalytic material along the width of the first surface.

In some embodiments, a structural catalyst body described herein further comprises a gradient of the first catalytic material along a length of the first surface of the inner partition wall. A gradient of the first catalytic material along the length of the first surface of the inner partition wall, in some embodiments, comprises a greater amount of the first catalytic material at a first end of the inner partition wall in comparison with an amount of the first catalytic material at a second end of the inner partition wall, the second end opposite the first end.

In some embodiments, a structural catalyst body described herein further comprises a gradient of the first catalytic material along a length of the second surface of the inner partition wall. A gradient of the first catalytic material along the length of the second surface of the inner partition wall, in some embodiments, comprises a greater amount of the first catalytic material at a first end of the inner partition wall in comparison with an amount of the first catalytic material at a second end of the inner partition wall, the second end opposite the first end. In some embodiments, the gradient profile of the first catalytic material along the length of the second surface of the inner partition wall is symmetrical or substantially symmetrical to the gradient profile of the first catalytic material along the length of the first surface of the inner partition wall.

In some embodiments, the first end of the inner partition wall corresponds to the fluid stream inlet side of the structural catalyst body, and the second end corresponds to the fluid stream outlet side of the structural catalyst body. In some embodiments, the first end of the inner partition wall corresponds to the fluid stream outlet side of the structural catalyst body, and the second end corresponds to the fluid stream inlet of the structural catalyst body.

In some embodiments, a structural catalyst body described herein comprises a gradient of bulk first catalytic material along a width of at least one inner partition wall. In some embodiments, bulk first catalytic material of the gradient decreases in concentration at the periphery of the width of the inner partition wall. In some embodiments, bulk first catalytic material increases in concentration along a central region of the width of the inner partition wall. In some embodiments, a gradient of bulk first catalytic material along the width of the inner partition wall has a profile symmetrical or substantially symmetrical about the midpoint of the profile.

In some embodiments, a structural catalyst body described herein comprises a gradient of bulk first catalytic material along a length of at least one inner partition wall. In some embodiments, a gradient of bulk first catalytic material along a length of an inner partition wall comprises a greater concentration of the bulk first catalytic material at a first end of the inner partition wall in comparison with an concentration of the bulk first catalytic material at a second end of the inner partition wall, the second end opposite the first end. As described herein, in some embodiments, the first end of the inner partition wall corresponds to the fluid stream inlet side of the structural catalyst body, and the second end corresponds to the fluid stream outlet side of the structural catalyst body. In some embodiments, the first end of the inner partition wall corresponds to the fluid stream outlet side of the structural catalyst body, and the second end corresponds to the fluid stream inlet of the structural catalyst body.

A structural catalyst body described herein, in some embodiments, further comprises at least one additional inner partition wall comprising one or more gradients of the first catalytic material described herein for an inner partition wall. In some embodiments, the at least one additional inner partition wall comprises a first surface and a second surface and a gradient of the first catalytic material along a width of the first surface. In some embodiments, the at least one additional inner partition wall further comprises a gradient of the first catalytic material along a width of the second surface.

Moreover, in some embodiments, the at least one additional inner partition wall comprises a gradient of bulk first catalytic material along a width of the additional inner partition wall. In some embodiments, the at least one additional inner partition wall comprises a gradient of bulk first catalytic material along a length of the inner partition wall.

The at least one additional inner partition wall, in some embodiments, comprises a gradient of the first catalytic material along the length of the first surface and/or second surface.

In some embodiments, the at least one additional inner partition wall comprises a plurality of additional inner partition walls such that greater than about 50 percent of the inner partition walls of the structural catalyst body comprise one or more gradients of the first catalytic material described herein. In some embodiments, greater than about 70 or greater than about 90 percent of the inner partition walls of the structural catalyst body comprise one or more gradients of the first catalytic material described herein. In some embodiments, greater than about 95 percent of the inner partition walls of the structural catalyst body comprise one or more gradients of the first catalytic material described herein.

In some embodiments, inner partition walls of a structural catalyst body described herein intersect to form one or more centerposts. In some embodiments, a structural catalyst body described herein comprises a gradient of bulk first catalytic material between a centerpost and at least one inner partition wall connected to the centerpost. In some embodiments, for example, the at least one inner partition wall comprises a greater concentration of a bulk first catalytic material than the centerpost. In some embodiments, a structural catalyst body described herein comprises a gradient of bulk first catalytic material between a centerpost and a plurality of inner partition walls connected to the centerpost. In some embodiments, each of the inner partition walls connected to the centerpost comprises a greater concentration of a bulk first catalytic material than the centerpost.

In some embodiments, inner partition walls define a plurality of flow channels or cells which extend through the structural catalyst body. In some embodiments, inner partition walls are at least partially surrounded by an outer peripheral wall or structure. In some embodiments, an outer peripheral wall is continuous or integral with one or more inner partition walls, such as in some honeycomb-like structural catalyst bodies. In some embodiments, an outer peripheral wall is part of a containment structure in which the inner partition walls are disposed, such as in the arrangement of plate catalyst elements or corrugated catalyst elements in a containment structure.

In some embodiments wherein the outer peripheral wall comprises bulk first catalytic material, inner partition walls of a structural catalyst body comprise more bulk first catalytic material than the outer peripheral wall. Moreover, in some embodiments, an interior surface of an outer peripheral wall comprises one or more gradients of the first catalytic material described herein for an inner partition wall. In some embodiments, outer surfaces of an outer peripheral wall do not display one or more gradients of the first catalytic material described herein. In some embodiments, an interior surface of an outer peripheral wall comprises a greater amount of first catalytic material than an exterior surface of the inner partition wall.

In some embodiments, a structural catalyst body described herein further comprises a gradient of a second catalytic material along the width of the first surface of at least one inner partition wall. In some embodiments, a gradient of a second catalytic material along the width of the first surface of at least one inner partition wall can have any of the properties recited herein for a gradient of the first catalytic material along the width of the first surface of an inner partition wall.

In some embodiments, a structural catalyst body described herein further comprises a gradient of a second catalytic material along the width of the second surface of at least one inner partition wall. In some embodiments, a gradient of a second catalytic material along the width of the second surface of the inner partition wall can have any of the properties recited herein for a gradient of the first catalytic material along the width of the second surface of an inner partition wall.

In some embodiments, a structural catalyst body described herein further comprises a gradient of second catalytic material along a length of the first surface of the at least one inner partition wall. In some embodiments, a gradient of at a second catalytic material along a length of the first surface of the inner partition wall can have any of the properties recited herein for a gradient of the first catalytic material along a length of the first surface of the inner partition wall.

In some embodiments, a structural catalyst body described herein further comprises a gradient of a second catalytic material along a length of the second surface of at least one inner partition wall. In some embodiments, a gradient of a second catalytic material along a length of the second surface of the inner partition wall can have any of the properties recited herein for a gradient of the first catalytic material along a length of the second surface of an inner partition wall.

In some embodiments, a structural catalyst body described herein further comprises a gradient of a bulk second catalytic material along the width of at least one inner partition wall. In some embodiments, a gradient of a bulk second catalytic material can have any of the properties recited herein for a gradient of a bulk first catalytic material along a width of the inner partition wall.

In some embodiments, a structural catalyst body described herein further comprises a gradient of a bulk second catalytic material along a length of at least one inner partition wall. In some embodiments, a gradient of a bulk second catalytic material along a length of an inner partition wall can have any of the properties recited herein for a gradient of a bulk first catalytic material along a length of an inner partition wall.

In some embodiments, a structural catalyst body described herein further comprises a gradient of a second catalytic material along the width of the first surface of at least one additional inner partition wall. In some embodiments, a gradient of a second catalytic material along the width of the first surface of at least one additional inner partition wall can have any of the properties recited herein for a gradient of a first catalytic material along the width of the first surface of an inner partition wall.

In some embodiments, a structural catalyst body described herein further comprises a gradient of a second catalytic material along the width of the second surface of at least one additional inner partition wall. In some embodiments, a gradient of a second catalytic material along the width of the second surface of at least one additional inner partition wall can have any of the properties recited herein for a gradient of a first catalytic material along the width of the second surface of an inner partition wall.

In some embodiments, a structural catalyst body described herein further comprises a gradient of a bulk second catalytic material along the width of at least one additional inner partition wall. In some embodiments, a gradient of bulk second catalytic material along the width of at least one additional inner partition wall can have any of the properties recited herein for a gradient of a bulk first catalytic material along the width of an inner partition wall.

In some embodiments, a structural catalyst body described herein further comprises a gradient of a bulk second catalytic material along a length of at least one additional inner partition wall. In some embodiments, a gradient of a bulk second catalytic material along the length of at least one additional inner partition wall can have any of the properties recited herein for a gradient of a bulk first catalytic material along a length of an inner partition wall.

In some embodiments, a structural catalyst body described herein further comprises a gradient of a second catalytic material along a length of the first and/or second surface of at least one additional inner partition wall. In some embodiments, a gradient of a second catalytic material along a length of the first and/or second surface of at least one additional inner partition wall can have any of the properties recited herein for a gradient of the first catalytic material along a length of the first/and or second surface of an inner partition wall.

In some embodiments, a structural catalyst body described herein comprises a gradient of a bulk second catalytic material between a centerpost and at least one inner partition wall connected to the centerpost. In some embodiments, for example, at least one inner partition wall comprises a greater concentration of a bulk second catalytic material than the centerpost. In some embodiments, a structural catalyst body described herein comprises a gradient of a bulk second catalytic material between a centerpost and a plurality of inner partition walls connected to the centerpost. In some embodiments, each of the inner partition walls connected to the centerpost comprises a greater concentration of a bulk second catalytic material than the centerpost.

Moreover, in some embodiments, an outer peripheral wall further comprises a bulk second catalytic material, wherein inner partition walls of the structural catalyst body comprise a greater amount of the bulk second catalytic material than the outer peripheral wall. In some embodiments, an interior surface of an outer peripheral wall further comprises one or more gradients of the second catalytic material described herein for an inner partition wall.

In some embodiments, a structural catalyst body further comprises a gradient of at least one additional catalytic material. A gradient of at least one additional catalytic material can comprise any construction and/or location in a structural catalyst body described herein for a gradient of a first catalytic material or a second catalytic material.

Structural catalyst bodies described herein, in some embodiments, comprise virgin structural catalyst bodies. In some embodiments, structural catalyst bodies described herein comprise used or regenerated structural catalyst bodies. In some embodiments, structural catalyst bodies described herein comprise honeycomb-like structural catalyst bodies, plate catalyst bodies or corrugated catalyst bodies.

In another aspect, a catalyst module is described herein comprising a framework and a plurality of structural catalyst bodies disposed in the framework, the structural catalyst bodies comprising a gradient of a first catalytic material along the width of a surface of at least one inner partition wall as described herein. In some embodiments, the catalytic activity of the catalyst bodies of the module is substantially uniform. In being substantially uniform, catalytic activity between catalyst bodies of the module, in some embodiments, varies less than about 20%. In some embodiments, in being substantially uniform, catalytic activity between catalyst bodies of the module varies less than 10%. In some embodiments, in being substantially uniform, catalytic activity between catalyst bodies of the module varies less than 5%. In some embodiments, catalytic activity comprises the selective catalytic reduction of nitrogen oxides, the oxidation of mercury or the oxidation of ammonia or combinations thereof.

In some embodiments, sulfur dioxide oxidation activity of catalyst bodies of the module is substantially uniform. In being substantially uniform, sulfur dioxide oxidation activity between catalyst bodies of the module, in some embodiments, varies less than 40%. In some embodiments, in being substantially uniform, sulfur dioxide oxidation activity between catalyst bodies of the module varies less than 20%. In some embodiments, in being substantially uniform, sulfur dioxide oxidation activity between catalyst bodies of the module varies less than 10%.

Moreover, in some embodiments, catalyst bodies of a module comprise one or more catalytic gradients described herein in addition to a gradient of a first catalytic material along the width of a surface of at least one inner partition wall. In some embodiments, for example, catalyst bodies of the module also comprise a gradient of bulk first catalytic material along a width and/or length of at least one inner partition as described herein. In some embodiments, catalyst bodies of a module comprise one or more gradients of a second catalytic material described herein.

In another aspect, at least one catalyst layer of a catalytic reactor is described herein, the catalyst layer comprising a plurality of structural catalyst bodies, the structural catalyst bodies comprising a gradient of catalytic material along a width of a surface of at least one inner partition wall as described herein. In some embodiments, the catalytic activity of the structural catalyst bodies of the catalyst layer is substantially uniform. In being substantially uniform, in some embodiments, catalytic activity between catalyst bodies of the catalyst layer varies less than about 20%. In some embodiments, in being substantially uniform, catalytic activity between catalyst bodies of the catalyst layer varies less than about 10%. In some embodiments, in being substantially uniform, catalytic activity between catalyst bodies of the catalyst layer varies less than about 5%. In some embodiments, catalytic activity comprises the selective catalytic reduction of nitrogen oxides, the oxidation of mercury or the oxidation of ammonia or combinations thereof.

In some embodiments, sulfur dioxide oxidation activity of catalyst bodies of the catalyst layer is substantially uniform. In being substantially uniform, sulfur dioxide oxidation activity between catalyst bodies of the catalyst layer, in some embodiments, varies less than 40%. In some embodiments, in being substantially uniform, sulfur dioxide oxidation activity between catalyst bodies of the catalyst layer varies less than 20%. In some embodiments, in being substantially uniform, sulfur dioxide oxidation activity between catalyst bodies of the catalyst layer varies less than 10%.

In some embodiments, catalyst bodies of a catalyst layer comprise one or more catalytic gradients described herein in addition to the gradient of a first catalytic material along the width of a surface of at least one inner partition wall. In some embodiments, for example, catalyst bodies of a catalyst layer also comprise a gradient of bulk first catalytic material along a width and/or length of at least one inner partition as described herein. In some embodiments, catalyst bodies of a catalyst layer comprise one or more gradients of a second catalytic material described herein. In some embodiments, catalyst bodies of a catalyst layer are arranged into one or more modules.

In another aspect, methods of treating a fluid stream, such as a flue gas or combustion gas stream, are described herein. In some embodiments, a method of treating a fluid stream comprises providing a structural catalyst body comprising at least one inner partition wall comprising a first surface and a second surface opposite the first surface, the inner partition wall having a gradient of a first catalytic material along a width of the first surface, passing the fluid stream through the structural catalyst body and catalytically reacting at least one chemical species in the fluid stream. In some embodiments, the fluid stream is flowed through one or more flow channels of the structural catalyst body. In some embodiments of methods described herein, the structural catalyst body can have any gradient of a first catalytic material and/or a second catalytic material described herein.

In some embodiments, catalytically reacting at least one chemical species in the fluid stream comprises catalytically reducing nitrogen oxides in the fluid stream. In some embodiments, catalytically reacting at least one chemical species in the fluid stream comprises oxidizing ammonia and/or mercury in the fluid stream.

In some embodiments of methods of treating a fluid stream, oxidation of sulfur dioxide to sulfur trioxide in the fluid stream is reduced. In one embodiment, for example, oxidation of sulfur dioxide is reduced during the selective catalytic reduction of nitrogen oxides in a fluid stream by a structural catalyst body described herein.

In some embodiments, the catalyst body is part of a module comprising a plurality of catalyst bodies described herein, where the fluid stream is passed into the module and through the catalyst bodies. In some embodiments, the module is part of a catalytic layer of a catalytic reactor.

In another aspect, methods of producing structural catalyst bodies described herein are provided. In some embodiments, a method of producing a structural catalyst body comprises providing a catalyst support comprising at least one inner partition wall comprising a first surface and a second surface opposite the first surface, impregnating the at least one inner partition wall with a solution comprising a first catalytic material and drying the at least one inner partition wall in a manner to establish a gradient of the first catalytic material along a width of the first surface. In some embodiments, the first catalytic material of the gradient decreases in amount at the periphery of the width of the first surface. In some embodiments, the first catalytic material of the gradient increases in amount along a central region of the width of the first surface.

In some embodiments, a gradient of the first catalytic material is also established along a width of the second surface. In some embodiments, the first catalytic material of the gradient decreases in amount at the periphery of the width of the second surface. The first catalytic material of the gradient, in some embodiments, increases in amount along a central region of the width of the second surface. In some embodiments, the gradient profile of the first catalytic material along the width of the second surface is symmetrical or substantially symmetrical to the gradient profile of the first catalytic material along the width of the first surface.

In some embodiments, the at least one inner partition wall of the structural catalyst support is dried in a manner to establish a gradient of bulk first catalytic material along a width of the inner partition wall. In some embodiments, bulk first catalytic material of the gradient decreases in concentration at the periphery of the width of the inner partition wall. In some embodiments, bulk first catalytic material increases in concentration along a central region of the width of the inner partition wall. In some embodiments, a gradient of a bulk first catalytic material along the width of the inner partition wall has a profile symmetrical or substantially symmetrical about the midpoint of the profile.

In some embodiments, the at least one inner partition wall of the structural catalyst support is dried in a manner to establish a gradient of the first catalytic material along a length of the first surface of the inner partition wall. A gradient of the first catalytic material along the length of a first surface of the inner partition wall, in some embodiments, comprises a greater amount of the first catalytic material at a first end of the inner partition wall in comparison with an amount of the first catalytic material at a second end of the inner partition wall, the second end opposite the first end.

In some embodiments, a gradient of the first catalytic material is also established along a length of the second surface of the inner partition wall. A gradient of the first catalytic material along the length of the second surface of the inner partition wall, in some embodiments, comprises a greater amount of the first catalytic material at a first end of the inner partition wall in comparison with an amount of the first catalytic material at a second end of the inner partition wall, the second end opposite the first end. In some embodiments, the gradient profile of the first catalytic material along the length of the second surface of the inner partition wall is symmetrical or substantially symmetrical to the gradient profile of the first catalytic material along the length of the first surface of the inner partition wall.

In some embodiments, the first end of the inner partition wall corresponds to the fluid stream inlet side of the structural catalyst body and the second end corresponds to the fluid stream outlet side of the structural catalyst body. Alternatively, in some embodiments, the first end of the inner partition wall corresponds to the outlet side of the structural catalyst body, and the second end corresponds to the fluid stream inlet side.

In some embodiments, the at least one inner partition wall of a structural catalyst body described herein is dried in a manner to establish a gradient of a bulk first catalytic material along a length of the inner partition wall. In some embodiments, a gradient of a first bulk catalytic material along a length of the inner partition wall comprises a greater concentration of the bulk first catalytic material at a first end of the inner partition wall in comparison with a concentration of the bulk first catalytic material at a second end of the inner partition wall, the second end opposite the first end.

In some embodiments of methods described herein, the structural catalyst body comprises a plurality of inner partition walls such that the inner partition walls are impregnated with a solution comprising the first catalytic material and dried in a manner to establish a gradient of the of the first catalytic material along a width and/or length of one or more surfaces of the inner partition walls. In some embodiments, the inner partition walls are dried in a manner to establish a gradient of a bulk first catalytic material along a width and/or length of the inner partition walls.

In some embodiments, inner partition walls of a structural catalyst body produced according to methods described herein intersect to form one or more centerposts. In some embodiments, at least one centerpost is impregnated with a solution comprising the first catalytic material and dried in a manner to establish a gradient of bulk first catalytic material between the centerpost and at least one of the inner partition walls. In some embodiments, for example, at least one inner partition wall comprises a greater concentration of bulk first catalytic material than the centerpost. In some embodiments, each of the inner partition walls connected to the centerpost comprises a greater concentration of bulk first catalytic material than the centerpost.

In some embodiments of methods described herein, the impregnating solution further comprises a second catalytic material. In some embodiments, a gradient of bulk metal or metal oxide second catalytic material is established along a width of the inner partition wall. Alternatively, in some embodiments, at least one inner partition wall of a structural catalyst body comprising one or more gradients of the first catalytic material described herein is further impregnated with a solution comprising a metal or metal oxide second catalytic material and dried in a manner to establish a gradient of the metal or metal oxide second catalytic material along a width of the first surface and/or second surface of the inner partition wall. In some embodiments, a gradient of bulk metal or metal oxide second catalytic material is established along a width of the inner partition wall.

In some embodiments, the second catalytic material of the gradient decreases in amount at the periphery of the width of the first surface. In some embodiments, the second catalytic material of the gradient increases in amount along a central region of the width of the first surface.

In some embodiments, a gradient of the second catalytic material is also established along a width of the second surface of the inner partition wall. In some embodiments, the second catalytic material of the gradient decreases in amount at the periphery of the width of the second surface. The second catalytic material of the gradient, in some embodiments, increases in amount along a central region of the width of the second surface. In some embodiments, the gradient profile of the second catalytic material along the width of the second surface is symmetrical or substantially symmetrical to the gradient profile of the second catalytic material along the width of the first surface.

In some embodiments, a gradient of the second catalytic material is also established along a length of the first surface of the inner partition wall. A gradient of the second catalytic material along a first surface of the inner partition wall, in some embodiments, comprises a greater amount of the second catalytic material at a first end of the inner partition wall in comparison with an amount of the second catalytic material at a second end of the inner partition wall, the second end opposite the first end.

In some embodiments, a gradient of the second catalytic material is also established along a length of the second surface of the inner partition wall. A gradient of the second catalytic material along the length of the second surface of the inner partition wall, in some embodiments, comprises a greater amount of the second catalytic material at a first end of the inner partition wall in comparison with an amount of the second catalytic material at a second end of the inner partition wall, the second end opposite the first end. In some embodiments, the gradient profile of the second catalytic material along the length of the second surface of the inner partition wall is symmetrical or substantially symmetrical to the gradient profile of the second catalytic material along the length of the first surface of the inner partition wall.

In some embodiments, a gradient of bulk second catalytic material is also established along a width of the inner partition wall. In some embodiments, bulk second catalytic material of the gradient decreases in concentration at the periphery of the width of the inner partition wall. In some embodiments, bulk second catalytic material increases in concentration along a central region of the width of the inner partition wall. In some embodiments, a gradient of bulk second catalytic material along the width of the inner partition wall has a profile symmetrical or substantially symmetrical about the midpoint of the profile.

In some embodiments, drying the at least one inner partition wall of a structural catalyst body described herein also establishes a gradient of a bulk second catalytic material along a length of the inner partition wall. In some embodiments, a gradient of a bulk second catalytic material along a length of the inner partition wall comprises a greater concentration of the bulk second catalytic material at a first end of the inner partition wall in comparison with a concentration of the bulk second catalytic material at a second end of the inner partition wall, the second end opposite the first end.

Moreover, in some embodiments of methods described herein, a gradient of the second catalytic material is also established along a width and/or length of one or more surfaces of a plurality of inner partition walls of the structural catalyst body. In some embodiments, a gradient of bulk second catalytic material is also established along a width and/or length of a plurality of inner partition walls of the structural catalyst body.

In some embodiments, at least one centerpost of a structural catalyst body is impregnated with the solution further comprising the second catalytic material, and drying the structural catalyst body also establishes a gradient of bulk second catalytic material between the centerpost and at least one of the inner partition walls forming the centerpost. In some embodiments, for example, at least one inner partition wall comprises a greater concentration of bulk second catalytic material than the centerpost. In some embodiments, each of the inner partition walls forming the centerpost comprises a greater concentration of bulk second catalytic material than the centerpost.

Additionally, in some embodiments, the outer peripheral wall of a structural catalyst body described herein is impregnated with the second catalytic material. In some embodiments wherein the outer peripheral wall comprises bulk second catalytic material, inner partition walls of the structural catalyst body comprise a greater concentration of bulk second catalytic material than the outer peripheral wall.

In some embodiments, first and/or second catalytic material of gradients of structural catalyst bodies produced according to methods described herein comprise one or more transition metals. In some embodiments, transition metals of the first and/or second catalytic material comprise vanadium, tungsten, molybdenum, platinum, palladium, ruthenium, rhodium, rhenium, iron, gold, silver, copper or nickel or alloys or oxides thereof. In some embodiments, the first and/or second catalytic material of gradients of structural catalyst bodies described herein are suitable for SCR applications and processes. In some embodiments, for example, the first and/or second catalytic material comprise $V_2O_5$, $WO_3$ or $MoO_3$ or mixtures thereof. In some embodiments, the first and/or second catalytic material comprise one or more precursors for forming a catalytic material suitable for SCR applications. In some embodiments, for example, the first and/or second catalytic material comprise one or more precursors for forming $V_2O_5$, $WO_3$ or $MoO_3$ or mixtures thereof.

In some embodiments, drying inner partition walls and/or centerposts of a structural catalyst support comprises flowing a gas over surfaces of the inner partition walls and/or centerposts at a rate and/or temperature sufficient to establish one or more gradients of the first catalytic material and/or second catalytic material described herein. Flowing a gas over surfaces of the inner partition walls and/or centerposts to establish one or more gradients of the first catalytic material and/or second catalytic material described herein can be administered in any manner not inconsistent with the objectives of the present invention. In some embodiments, gas is flowed over all or substantially all of the inner partition walls and/or centerposts of a structural catalyst support in an even or substantially even manner.

Additionally, in some embodiments, the impregnation solution of a method described herein further comprises at least one additional catalytic material. In such embodiments, drying the structural catalyst body can provide one or more gradients of the additional catalytic material having a construction and/or location on the structural catalyst body consistent with any gradient of the first and/or second catalytic material described herein.

In some embodiments, a structural catalyst support is virgin. A virgin structural catalyst support, in some embodiments, has not been used or previously installed into a catalytic reactor for conducting catalytic reactions in a fluid stream.

In some embodiments, a structural catalyst support is used. A used structural catalyst support, in some embodiments, has been previously installed in a catalytic reactor for conducting catalytic reactions in a fluid stream. In some embodiments, a used catalyst support is part of a structural catalyst body in need of regeneration.

In some embodiments, virgin or used structural catalyst supports comprise honeycomb-like structural supports, plate structural supports or corrugated structural supports.

In some embodiments of methods described herein, structural catalyst supports comprising a plurality of inner partition walls are arranged in the framework of a catalyst module. In such embodiments, the catalyst module comprising the structural catalyst supports can be immersed in the solution of catalytic material to impregnate the inner partition walls and/or centerposts of the structural catalyst supports with catalytic material.

In some embodiments, the structural catalyst supports impregnated with a solution of the first catalytic material are dried while remaining the framework of the catalyst module to establish one or more gradients of the first catalytic material described herein. In some embodiments, the impregnation solution further comprises a second catalytic material wherein drying the structural catalyst supports while remaining in the framework of the catalyst module also establishes one or more gradients of the second catalytic material as described herein. In some embodiments, for example, a gas is flowed through the module and over surfaces of the inner partition walls and/or centerposts of the structural catalyst supports at a rate and/or temperature sufficient to establish one or more gradients of the first and/or second catalytic material described herein. In some embodiments, the gas is flowed evenly or substantially evenly through the structural catalyst supports arranged in the framework of the module such that the catalytic activity of the resulting structural catalyst bodies is substantially uniform across the module. In being substantially uniform, catalytic activity between catalyst bodies in the module, in some embodiments, varies less than about 20%. In some embodiments, in being substantially uniform, catalytic activity between catalyst bodies of the module varies less than 10%. In some embodiments, in being substantially uniform, catalytic activity between catalyst bodies of the module varies less than 5%. In some embodiments, catalytic activity comprises the selective catalytic reduction of nitrogen oxides, the oxidation of mercury or the oxidation of ammonia or combinations thereof.

In some embodiments, sulfur dioxide oxidation activity of catalyst bodies of the module is substantially uniform across the module. In being substantially uniform, sulfur dioxide oxidation activity between catalyst bodies of the module, in some embodiments, varies less than 40%. In some embodiments, in being substantially uniform, sulfur dioxide oxidation activity between catalyst bodies of the module varies less than 20%. In some embodiments, in being substantially uniform, sulfur dioxide oxidation activity between catalyst bodies of the module varies less than 10%.

In some embodiments, gradients of first and/or second catalytic material produced according to the forgoing methods can have any of the structural and/or compositional properties described herein for the gradients of the first and/or second catalytic material.

These and other embodiments are described in greater detail in the detailed description which follows.

BRIEF DESCRIPTION OF THE DRAWINGS

FIG. 5 provides a table detailing structural catalyst bodies having various gradient composition according to some embodiments described herein.

DETAILED DESCRIPTION

Figure 1:
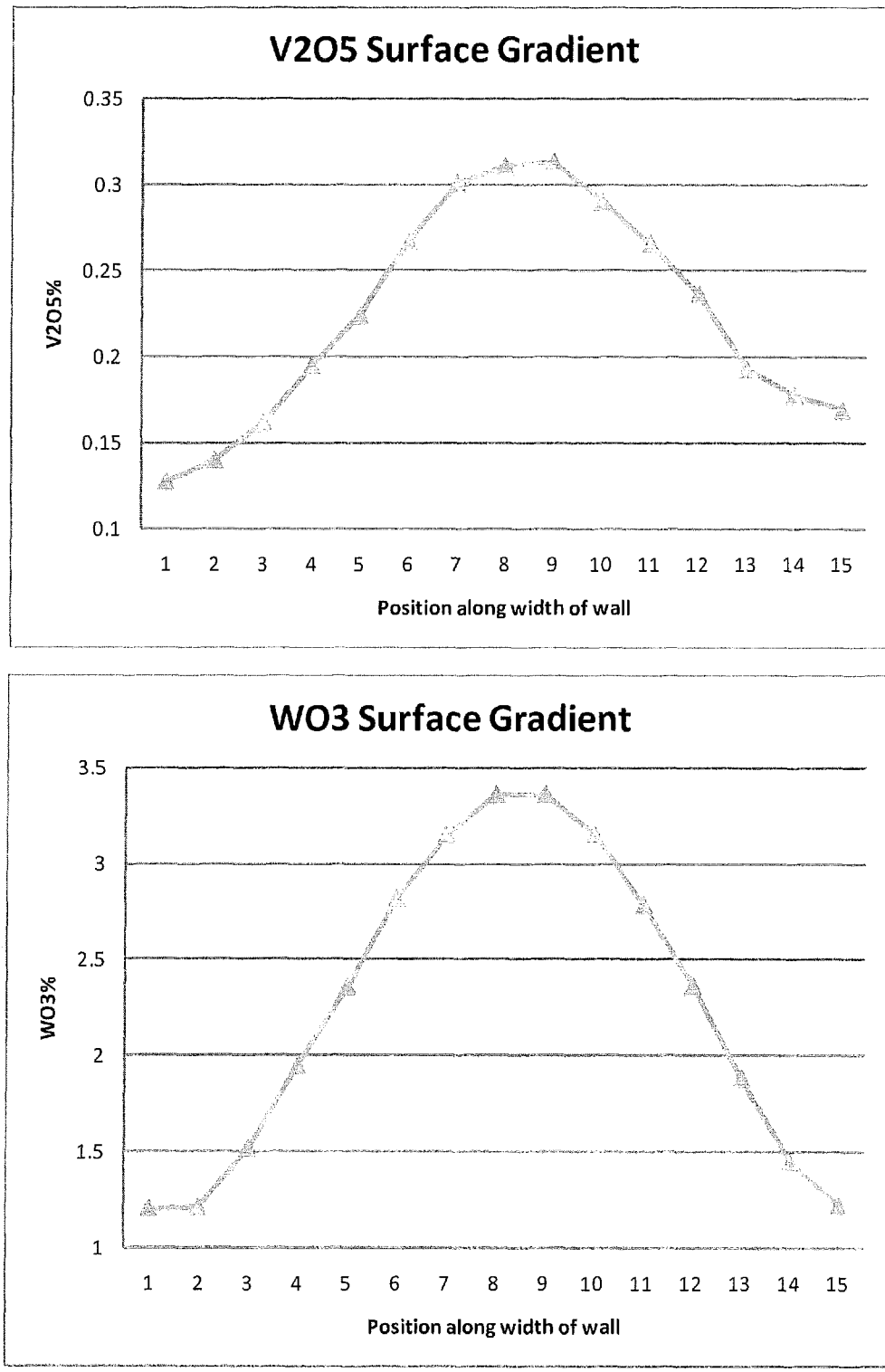
FIG. 1 illustrates gradient profiles of first and second catalytic materials along the width of the surface of an inner partition wall of a structural catalyst body according to one embodiment described herein.

The present invention can be understood more readily by reference to the following detailed description, examples and drawings and their previous and following descriptions. Elements, apparatus and methods of the present invention, however, are not limited to the specific embodiments presented in the detailed description, examples and drawings. It should be recognized that these embodiments are merely illustrative of the principles of the present invention. Numerous modifications and adaptations will be readily apparent to those of skill in the art without departing from the spirit and scope of the invention.

Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

In one aspect, catalyst bodies are described herein which, in some embodiments, display heterogeneous distributions of catalytic material. In some embodiments, catalyst bodies described herein are operable for the selective catalytic reduction of nitrogen oxides in a flue gas stream.

In some embodiments, a structural catalyst body described herein comprises at least one inner partition wall comprising a first surface and a second surface opposite the first surface, the inner partition wall having a gradient of a first catalytic material along a width of the first surface. In some embodiments, the first catalytic material of the gradient decreases in amount at the periphery of the width of the first surface.

In some embodiments, the surface of an inner partition wall of a structural catalyst body described herein includes a portion of the inner partition wall up to a depth of about 100 µm. In some embodiments, the surface of an inner partition wall includes a portion of the inner partition wall up to a depth of about 50 µm or up to about 25 µm. In some embodiments, the surface of an inner partition wall includes a portion of the inner partition wall up to a depth of about 10 µm or up to about 5 µm.

In some embodiments, the first catalytic material of the gradient increases in amount along a central region of the width of the first surface. In some embodiments, the amount of the first catalytic material in a central region of the width of the first surface exceeds the amount of the first catalytic material at the periphery of the width of the first surface. In some embodiments, the amount of the first catalytic material at a point in a central region of the width of the first surface is greater than the amount of the first catalytic material at a point at the periphery of the width of the first surface.

In some embodiments, the amount of the first catalytic material at a point in a central region of the width of the first surface is at least 1.1 times greater or 1.3 times greater than the amount of the first catalytic material at a point at the periphery of the width of the first surface. In some embodiments, the amount of the first catalytic material at a point in a central region of the width of the first surface is at least 1.5 times or at least 2 times greater than the amount of the first catalytic material at a point at the periphery of the width of the first surface. In some embodiments, the amount of the first catalytic material at a point in a central region of the width of the first surface is at least 3 times or at least 3.5 times greater than the amount of the first catalytic material at a point at the periphery of the width of the first surface. In some embodiments, the amount of the first catalytic material at a point in a central region of the width of the first surface is at least 4 times or at least 4.5 times greater than the amount of the first catalytic material at a point at the periphery of the width of the first surface. In some embodiments, the amount of the first catalytic material at a point in a central region of the width of the first surface is at least 5 times or at least 10 times greater than the amount of the first catalytic material at a point at the periphery of the width of the first surface. In some embodiments, an amount of the first catalytic material at a plurality of points in a central region of the width of the first surface is at least 1.1 times greater or 1.3 times greater than an amount of the first catalytic material at one or more points at the periphery of the width of the first surface.

In some embodiments, the amount of the first catalytic material at point in a central region of the width of the first surface is 1.3 times to 10 times greater than the amount of the first catalytic material at a point at the periphery of the width of the first surface. In some embodiments, the amount of the first catalytic material at a plurality of points in a central region of the width of the first surface is 1.3 times to 10 times greater than the amount of the first catalytic material at one or more points at the periphery of the width of the first surface.

In some embodiments of a section of an inner partition wall, the average amount of the first catalytic material in a central region of the width of the first surface of the inner partition wall section is at least 1.5 times greater than the average amount of the first catalytic material at the periphery of the width of the first surface of the inner partition wall section.

In some embodiments, a central region of the width of the first surface comprises up to about 20 percent of the total width of the first surface, the central region centered around the midpoint of the width of the first surface. In some embodiments, a central region of the width of the first surface comprises up to about 40 percent of the total width of the first surface, the central region centered around the midpoint of the width of the first surface.

In some embodiments, the periphery of the width of the first surface comprises up to about 15 percent of the total width of the first surface beginning at the edge of the width of the first surface and extending in a direction toward the central region.

In some embodiments, a gradient of a first catalytic material along the width of the first surface of the inner partition wall has a profile symmetrical or substantially symmetrical about the midpoint of the profile.

A structural catalyst body described herein, in some embodiments, further comprises a gradient of the first catalytic material along a width of the second surface. In some embodiments, the first catalytic material of the gradient decreases in amount at the periphery of the width of the second surface. The first catalytic material of the gradient, in some embodiments, increases in amount along a central region of the second surface.

In some embodiments, the amount of the first catalytic material at a point in a central region of the width of the second surface is at least 1.1 times greater or 1.3 times greater than the amount of the first catalytic material at a point at the periphery of the width of the second surface. In some embodiments, the amount of the first catalytic material at a point in a central region of the width of the second surface is at least 1.5 times or at least 2 times greater than the amount of the first catalytic material at a point at the periphery of the width of the second surface. In some embodiments, the amount of the first catalytic material at a point in a central region of the width of the second surface is at least 3 times or at least 3.5 times greater than the amount of the first catalytic material at a point at the periphery of the width of the second surface. In some embodiments, the amount of the first catalytic material at a point in a central region of the width of the second surface is at least 4 times or at least 4.5 times greater than the amount of the first catalytic material at a point at the periphery of the width of the second surface. In some embodiments, the amount of the first catalytic material at a point in a central region of the width of the second surface is at least 5 times or at least 10 times greater than the amount of the first catalytic material at a point at the periphery of the width of the second surface. In some embodiments, an amount of the first catalytic material at a plurality of points in a central region of the width of the second surface is at least 1.1 times greater or 1.3 times greater than the amount of the first catalytic material at one or more points at the periphery of the width of the second surface.

In some embodiments, the amount of the first catalytic material at a point in a central region of the width of the second surface is 1.3 times to 10 times greater than the amount of the first catalytic material at a point at the periphery of the width of the second surface. In some embodiments, the amount of the first catalytic material at a plurality of points in a central region of the width of the second surface is 1.3 times to 10 times greater than the amount of the first catalytic material at one or more points at the periphery of the width of the second surface.

In some embodiments of a section of an inner partition wall, the average amount of the first catalytic material in a central region of the width of the second surface of the inner partition wall section is at least 1.5 times greater than the average amount of the first catalytic material at the periphery of the width of the second surface of the inner partition wall section.

In some embodiments, a central region of the width of the second surface comprises up to about 20 percent of the total width of the second surface, the central region centered around the midpoint of the width of the second surface. In some embodiments, a central region of the width of the second surface comprises up to about 40 percent of the total width of the second surface, the central region centered around the midpoint of the width of the second surface.

In some embodiments, a periphery of the width of the second surface comprises up to about 15 percent of the total width of the second surface beginning at the edge of the width of the second surface and extending in a direction toward the central region.

In some embodiments, a gradient of the first catalytic material along the width of the second surface of the inner partition wall has a profile symmetrical or substantially symmetrical about the midpoint of the profile.

In some embodiments, a structural catalyst body described herein further comprises a gradient of a second catalytic material along the width of the first surface of the at least one inner partition wall. In some embodiments, the second catalytic material of the gradient decreases in amount at the periphery of the width of the first surface.

In some embodiments, the second catalytic material of the gradient increases in amount along a central region of the width of the first surface. In some embodiments, the amount of the second catalytic material in a central region of the width of the first surface exceeds the amount of the second catalytic material at the periphery of the width of the first surface. In some embodiments, the amount of the second catalytic material at a point in a central region of the width of the first surface is greater than the amount of the second catalytic material at a point at the periphery of the width of the first surface.

In some embodiments, the amount of the second catalytic material at a point in a central region of the width of the first surface is at least 1.1 times greater or 1.3 times greater than the amount of the second catalytic material at a point at the periphery of the width of the first surface. In some embodiments, the amount of the second catalytic material at a point in a central region of the width of the first surface is at least 1.5 times or at least 2 times greater than the amount of the second catalytic material at a point at the periphery of the width of the first surface. In some embodiments, the amount of the second catalytic material at a point in a central region of the width of the first surface is at least 3 times or at least 3.5 times greater than the amount of the second catalytic material at a point at the periphery of the width of the first surface. In some embodiments, the amount of the second catalytic material at a point in a central region of the width of the first surface is at least 4 times or at least 4.5 times greater than the amount of the second catalytic material at a point at the periphery of the width of the first surface. In some embodiments, the amount of the second catalytic material at a point in a central region of the width of the first surface is at least 5 times or at least 10 times greater than the amount of the second catalytic material at a point at the periphery of the width of the first surface. In some embodiments, an amount of the second catalytic material at a plurality of points in a central region of the width of the first surface is at least 1.1 times greater or 1.3 times greater than an amount of the second catalytic material at one or more points at the periphery of the width of the first surface.

In some embodiments, the amount of the second catalytic material at point in a central region of the width of the first surface is 1.3 times to 10 times greater than the amount of the second catalytic material at a point at the periphery of the width of the first surface. In some embodiments, the amount of the second catalytic material at a plurality of points in a central region of the width of the first surface is 1.3 times to 10 times greater than the amount of the second catalytic material at one or more points at the periphery of the width of the first surface.

In some embodiments, a gradient of a second catalytic material along the width of the first surface of the inner partition wall has a profile symmetrical or substantially symmetrical about the midpoint of the profile.

In some embodiments of a section of an inner partition wall, the average amount of the second catalytic material in a central region of the width of the first surface of the inner partition wall section is at least 1.5 times greater than the average amount of the second catalytic material at the periphery of the width of the first surface of the inner partition wall section.

A structural catalyst body described herein, in some embodiments, further comprises a gradient of the second catalytic material along a width of the second surface. In some embodiments, the second catalytic material of the gradient decreases in amount at the periphery of the width of the second surface. The second catalytic material of the gradient, in some embodiments, increases in amount along a central region of the second surface.

In some embodiments, the amount of the second catalytic material at a point in a central region of the width of the second surface is at least 1.1 times greater or 1.3 times greater than the amount of the second catalytic material at a point at the periphery of the width of the second surface. In some embodiments, the amount of the second catalytic material at a point in a central region of the width of the second surface is at least 1.5 times or at least 2 times greater than the amount of the second catalytic material at a point at the periphery of the width of the second surface. In some embodiments, the amount of the second catalytic material at a point in a central region of the width of the second surface is at least 3 times or at least 3.5 times greater than the amount of the second catalytic material at a point at the periphery of the width of the second surface. In some embodiments, the amount of the second catalytic material at a point in a central region of the width of the second surface is at least 4 times or at least 4.5 times greater than the amount of the second catalytic material at a point at the periphery of the width of the second surface. In some embodiments, the amount of the second catalytic material at a point in a central region of the width of the second surface is at least 5 times or at least 10 times greater than the amount of the second catalytic material at a point at the periphery of the width of the second surface. In some embodiments, the amount of the second catalytic material at a plurality of points in a central region of the width of the second surface is at least 1.1 times greater or 1.3 times greater than the amount of the second catalytic material at one or more points at the periphery of the width of the second surface.

In some embodiments, the amount of the second catalytic material at a point in a central region of the width of the second surface is 1.3 times to 10 times greater than the amount of the second catalytic material at a point at the periphery of the width of the second surface. In some embodiments, the amount of the second catalytic material at a plurality of points in a central region of the width of the second surface is 1.3 times to 10 times greater than the amount of the second catalytic material at one or more points at the periphery of the width of the second surface.

In some embodiments of a section of an inner partition wall, the average amount of the second catalytic material in a central region of the width of the second surface of the inner partition wall section is at least 1.5 times greater than the average amount of the second catalytic material at the periphery of the width of the second surface of the inner partition wall section.

In some embodiments, a gradient of the first catalytic material along the width of the second surface of the inner partition wall has a profile symmetrical or substantially symmetrical about the midpoint of the profile.

FIG. 1 illustrates gradient profiles of first and second catalytic materials along the width of the surface of an inner partition wall of a structural catalyst body according to one embodiment described herein. As illustrated in FIG. 1, the first catalytic material of vanadium pentoxide ($V_2O_5$) and the second catalytic material of tungsten oxide ($WO_3$) increase in amount along a central region of the width of the inner partition wall surface. Moreover, the $V_2O_5$ first catalytic material and the $WO_3$ second catalytic material decrease in amount at the periphery of the width of the inner partition wall surface. The profiles of the $V_2O_5$ first catalytic material and the $WO_3$ second catalytic material are also substantially symmetrical about the midpoints of the profiles.

In some embodiments, a structural catalyst body described herein comprises a gradient of bulk first catalytic material along the width of at least one inner partition wall. In some embodiments, bulk first catalytic material of the gradient decreases in concentration at the periphery of the width of the inner partition wall. In some embodiments, bulk first catalytic material increases in concentration along a central region of the width of the inner partition wall. In some embodiments, a gradient of bulk first catalytic material along the width of the inner partition wall has a profile symmetrical or substantially symmetrical about the midpoint of the profile.

In some embodiments, the concentration of bulk first catalytic material at a point in a central region of the width of the inner partition wall is at least 1.1 times greater or 1.3 times greater than the concentration of bulk first catalytic material at a point at the periphery of the width of the inner partition wall. In some embodiments, the concentration of bulk first catalytic material at a point in a central region of the width of the inner partition wall is at least 1.5 times or at least 2 times greater than the concentration of bulk first catalytic material at a point at the periphery of the width of the inner partition wall. In some embodiments, the concentration of bulk first catalytic material at a point in a central region of the width of the inner partition wall is at least 3 times or at least 3.5 times greater than the concentration of bulk first catalytic material at a point at the periphery of the width of the inner partition wall. In some embodiments, the concentration of bulk first catalytic material at a point in a central region of the width of the inner partition wall is at least 4 times or at least 4.5 times greater than the concentration of bulk first catalytic material at a point at the periphery of the width of the inner partition wall. In some embodiments, the concentration of bulk first catalytic material at a point in a central region of the width of the inner partition wall is at least 5 times or at least 10 times greater than the concentration of bulk first catalytic material at a point at the periphery of the width of the inner partition wall. In some embodiments, the concentration of bulk first catalytic material at a plurality of points in a central region of the width of the inner partition wall is at least 1.1 times greater or 1.3 times greater than the concentration of bulk first catalytic material at one or more points at the periphery of the width of the inner partition wall.

In some embodiments, the concentration of bulk first catalytic material at a point in a central region of the width of the inner partition wall is 1.3 times to 10 times greater than the concentration of bulk first catalytic material at a point at the periphery of the width of the inner partition wall. In some embodiments, a concentration of bulk first catalytic material at a plurality of points in the central region of the width of the inner partition wall is 1.3 times to 10 times greater than the concentration of bulk first catalytic material at one or more points at the periphery of the width of the inner partition wall.

In some embodiments, a central region of the width of the inner partition wall comprises up to about 20 percent of the total width of the inner partition wall, the central region centered around the midpoint of the width of the inner partition wall. In some embodiments, a central region of the width of the inner partition wall comprises up to about 40 percent of the total width of the inner partition wall, the central region centered around the midpoint of the width of the inner partition wall.

In some embodiments, a periphery of the width of the inner partition wall comprises up to about 15 percent of the total width of the inner partition wall beginning at the edge of the width of the inner partition wall and extending in a direction toward the central region.

In some embodiments, a structural catalyst body described herein further comprises a gradient of bulk second catalytic material along the width of the at least one inner partition wall comprising the gradient of bulk first catalytic material.

In some embodiments, bulk second catalytic material of the gradient decreases in concentration at the periphery of the width of the inner partition wall. In some embodiments, bulk second catalytic material increases in concentration along a central region of the width of the inner partition wall. In some embodiments, a gradient of bulk second catalytic material along the width of the inner partition wall has a profile symmetrical or substantially symmetrical about the midpoint of the profile.

In some embodiments, the concentration of bulk second catalytic material at a point in a central region of the width of the inner partition wall is at least 1.1 times greater or 1.3 times greater than the concentration of bulk second catalytic material at a point at the periphery of the width of the inner partition wall. In some embodiments, the concentration of bulk second catalytic material at a point in a central region of the width of the inner partition wall is at least 1.5 times or at least 2 times greater than the concentration of bulk second catalytic material at a point at the periphery of the width of the inner partition wall. In some embodiments, the concentration of bulk second catalytic material at a point in a central region of the width of the inner partition wall is at least 3 times or at least 3.5 times greater than the concentration of bulk second catalytic material at a point at the periphery of the width of the inner partition wall. In some embodiments, the concentration of bulk second catalytic material at a point in a central region of the width of the inner partition wall is at least 4 times or at least 4.5 times greater than the concentration of bulk second catalytic material at a point at the periphery of the width of the inner partition wall. In some embodiments, the concentration of bulk second catalytic material at a point in a central region of the width of the inner partition wall is at least 5 times or at least 10 times greater than the concentration of bulk second catalytic material at a point at the periphery of the width of the inner partition wall. In some embodiments, the concentration of bulk second catalytic material at a plurality of points in a central region of the width of the inner partition wall is at least 1.1 times greater or 1.3 times greater than the concentration of bulk second catalytic material at one or more points at the periphery of the width of the inner partition wall.

In some embodiments, the concentration of bulk second catalytic material at a point in a central region of the width of the inner partition wall is 1.3 times to 10 times greater than the concentration of bulk second catalytic material at a point at the periphery of the width of the inner partition wall. In some embodiments, the concentration of bulk second catalytic material at a plurality of points in the central region of the width of the inner partition wall is 1.3 times to 10 times greater than the concentration of bulk second catalytic material at one or more points at the periphery of the width of the inner partition wall.

In some embodiments, a structural catalyst body described herein further comprises a gradient of first catalytic material along a length of the first surface of the inner partition wall. A gradient of first catalytic material along the length of the first surface of the inner partition wall, in some embodiments, comprises a greater amount of first catalytic material at a first end of the inner partition wall in comparison with an amount of the first catalytic material at a second end of the inner partition wall, the second end opposite the first end. In some embodiments, the amount of first catalytic material at a point on the first surface at the first end of the inner partition wall is 1.3 times to 10 times greater than the amount of the first catalytic material at a point on the first surface at the second end of the inner partition wall. In some embodiments, the amount of first catalytic material at a point on the first surface at the first end of the inner partition wall is at least 10 times greater than the amount of first catalytic material at a point on the first surface at the second end of the inner partition wall.

In some embodiments, a structural catalyst body described herein further comprises a gradient of second catalytic material along a length of the first surface of the inner partition wall. A gradient of second catalytic material along the length of the first surface of the inner partition wall, in some embodiments, comprises a greater amount of second catalytic material at a first end of the inner partition wall in comparison with an amount of the second catalytic material at a second end of the inner partition wall, the second end opposite the first end. In some embodiments, the amount of second catalytic material at a point on the first surface at the first end of the inner partition wall is 1.3 times to 10 times greater than the amount of the second catalytic material at a point on the first surface at the second end of the inner partition wall. In some embodiments, the amount of second catalytic material at a point on the first surface at the first end of the inner partition wall is at least 10 times greater than the amount of second catalytic material at a point on the first surface at the second end of the inner partition wall.

In some embodiments, a structural catalyst body described herein further comprises a gradient of first catalytic material along a length of the second surface of the inner partition wall. A gradient of first catalytic material along the length of the second surface of the inner partition wall, in some embodiments, comprises a greater amount of the first catalytic material at a first end of the inner partition wall in comparison with an amount of the first catalytic material at a second end of the inner partition wall, the second end opposite the first end. In some embodiments, the amount of the first catalytic material at a point on the second surface at the first end of the inner partition wall is 1.3 times to 10 times greater than the amount of the first catalytic material at a point on the second surface at the second end of the inner partition wall. In some embodiments, the amount of the first catalytic material at a point on the second surface at the second end of the inner partition wall is at least 10 times greater than the amount of the first catalytic material at a point on the second surface at the second end of the inner partition wall.

In some embodiments, the gradient of the first catalytic material along the length of the second surface of the inner partition wall is symmetrical or substantially symmetrical to the gradient of the first catalytic material along the length of the first surface of the inner partition wall.

In some embodiments, the first end of the inner partition wall corresponds to the fluid stream inlet side of the structural catalyst body and the second end corresponds to the fluid stream outlet side of the structural catalyst body.

In some embodiments, a structural catalyst body described herein further comprises a gradient of second catalytic material along a length of the second surface of the inner partition wall. A gradient of second catalytic material along the length of the second surface of the inner partition wall, in some embodiments, comprises a greater amount of the second catalytic material at a first end of the inner partition wall in comparison with an amount of the second catalytic material at a second end of the inner partition wall, the second end opposite the first end. In some embodiments, the amount of the second catalytic material at a point on the second surface at the first end of the inner partition wall is 1.3 times to 10 times greater than the amount of the second catalytic material at a point on the second surface at the second end of the inner partition wall. In some embodiments, the amount of the second catalytic material at a point on the second surface at the second end of the inner partition wall is at least 10 times greater than the amount of the second catalytic material at a point on the second surface at the second end of the inner partition wall.

In some embodiments, the gradient of the second catalytic material along the length of the second surface of the inner partition wall is symmetrical or substantially symmetrical to the gradient of the second catalytic material along the length of the first surface of the inner partition wall.

In some embodiments, a structural catalyst body described herein comprises a gradient of bulk first catalytic material along a length of at least one inner partition wall. In some embodiments, a gradient of bulk first catalytic material along a length of the inner partition wall comprises a greater concentration of bulk first catalytic material at a first end of the inner partition wall in comparison with a concentration of bulk first catalytic material at a second end of the inner partition wall, the second end opposite the first end. As described herein, in some embodiments, the first end of the inner partition wall corresponds to the fluid stream inlet side of the structural catalyst body and the second end corresponds to the fluid stream outlet side of the structural catalyst body.

In some embodiments, the concentration of bulk first catalytic material at a point at the first end of the inner partition wall is 1.3 times to 10 times greater than the concentration of bulk first catalytic material at a point at the second end of the inner partition wall. In some embodiments, the concentration of bulk first catalytic material at a point at the first end of the inner partition wall is at least 10 times greater than the concentration of bulk first catalytic material at a point at the second end of the inner partition wall.

In some embodiments, a structural catalyst body described herein further comprises a gradient of bulk second first catalytic material along a length of at least one inner partition wall. In some embodiments, a gradient of a bulk second catalytic material along a length of the inner partition wall comprises a greater concentration of bulk second catalytic material at a first end of the inner partition wall in comparison with a concentration of bulk second catalytic material at a second end of the inner partition wall, the second end opposite the first end.

In some embodiments, the concentration of bulk second catalytic material at a point at the first end of the inner partition wall is 1.3 times to 10 times greater than the concentration of bulk second catalytic material at a point at the second end of the inner partition wall. In some embodiments, the concentration of bulk second catalytic material at a point at the first end of the inner partition wall is at least 10 times greater than the concentration of bulk second catalytic material at a point at the second end of the inner partition wall.

A structural catalyst body described herein, in some embodiments, further comprises at least one additional inner partition wall comprising one or more gradients of first catalytic material and/or second catalytic material described herein for an inner partition wall. In some embodiments, the at least one additional inner partition wall comprises a first surface and a second surface and a gradient of first catalytic material and/or second catalytic material along a width of the first surface. In some embodiments, the at least one additional inner partition wall further comprises a gradient of first catalytic material and/or second catalytic material along a width of the second surface. A gradient of first catalytic material and/or second catalytic material along the width of the first surface and/or the second surface of the at least one additional inner partition wall, in some embodiments, has one or more properties consistent with the same described for the inner partition wall hereinabove.

Moreover, in some embodiments, the at least one additional inner partition wall comprises a gradient of bulk first catalytic material and/or bulk second catalytic material along a width of the additional inner partition wall. In some embodiments, the at least one additional inner partition wall comprises a gradient of bulk first catalytic material and/or second catalytic material along a length of the inner partition wall.

The at least one additional inner partition wall, in some embodiments, comprises a gradient of first catalytic material and/or second catalytic material along the length of the first surface and/or second surface. A gradient of the first catalytic material and/or second catalytic material along the length of the first surface and/or the second surface of the at least one additional inner partition wall, in some embodiments, has one or more properties consistent with the same described for the inner partition wall hereinabove.

In some embodiments, the at least one additional inner partition wall comprises a plurality of additional inner partition walls such that greater than about 50 percent or greater than about 70 percent of the inner partition walls of the structural catalyst body comprise one or more gradients of catalytic material described herein. In some embodiments, greater than about 90 percent of the inner partition walls of the structural catalyst body comprise one or more gradients of catalytic material described herein. In some embodiments, greater than about 95 percent of the inner partition walls of the structural catalyst body comprise one or more gradients of catalytic material described herein.

Figure 2:
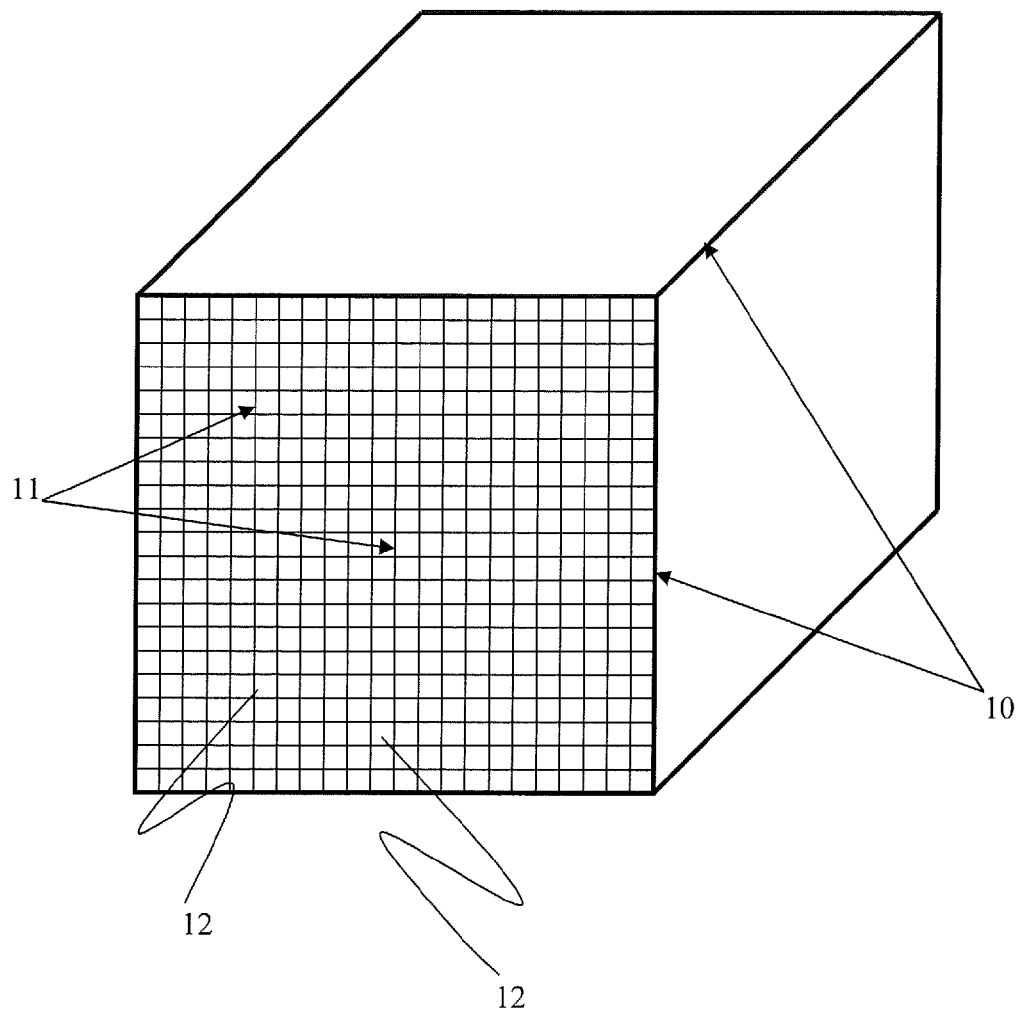
FIG. 2 illustrates a structural catalyst body according to one embodiment described herein.

FIG. 2 illustrates a honeycomb-like structural catalyst body according to one embodiment described herein. The structural catalyst body of FIG. 2 comprises an outer peripheral wall (10) and a plurality of inner partition walls (11), wherein one or more of the inner partition walls (11) have one or more gradients of first and/or second catalytic material as described herein. The inner partition walls (11) define a plurality of flow channels or cells (12) which extend longitudinally through the honeycomb-like structural catalyst body.

Figure 3:
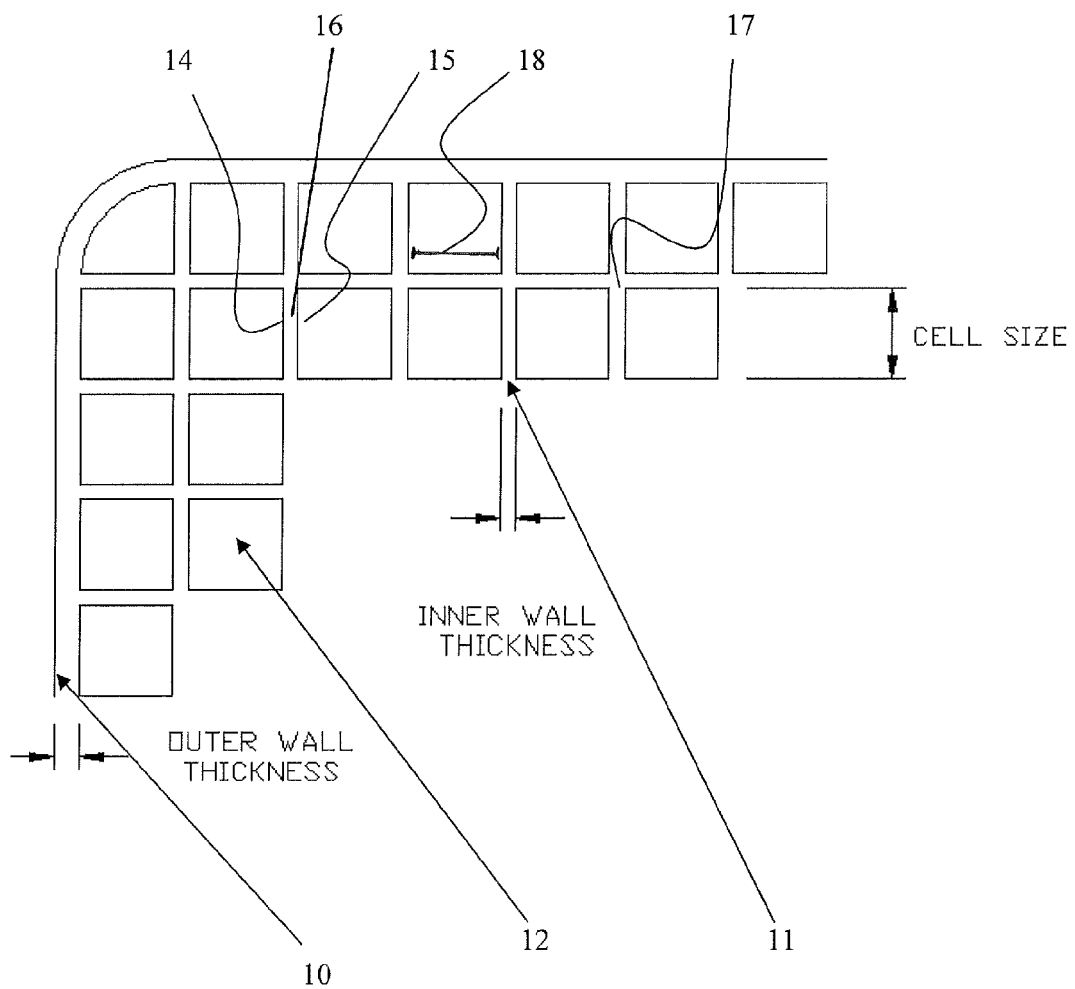
FIG. 3 illustrates a cross-section of a portion of a structural catalyst body according to one embodiment described herein.

FIG. 3 illustrates a cross-section of a portion of a honeycomb-like structural catalyst body according to one embodiment described herein. The flow channels (12) of the structural catalyst body are defined by the inner partition walls (11). The inner partition walls (11) and their junctures with the outer peripheral wall (10) serve as boundaries of adjacent flow channels (12). An inner partition wall (11) comprises a first surface (14), a second surface (15) and a cross-sectional region (16) bridging the first surface (14) and the second surface (15). The first surface (14) and/or the second surface (15) have a gradient of first catalytic material and/or second catalytic material along the width of the first surface and/or the second surface as described herein. The width of an inner partition wall surface in the embodiment of FIG. 3 is illustrated as (18). As the cross-sectional profile of flow channels (12) of the honeycomb-like structural catalyst body illustrated in FIG. 3 is square, the inner partition walls (11) have equal or substantially equal widths (18).

In some embodiments, cross-sectional profiles of flow channels can be nominally polygonal such as triangular, square, rectangular or hexagonal. In some embodiments, cross-sectional profiles of flow channels can be round or oval or combinations with polygonal and curved shapes such as annular sectors. Moreover, in some embodiments, the cross-sectional profile of the outer perimeter of the outer peripheral wall of the catalytic body can be square, rectangular, round, oval, circular sectors such as pie slices or quadrants, or any other geometric shape or shapes convenient for a given application.

Figure 6:
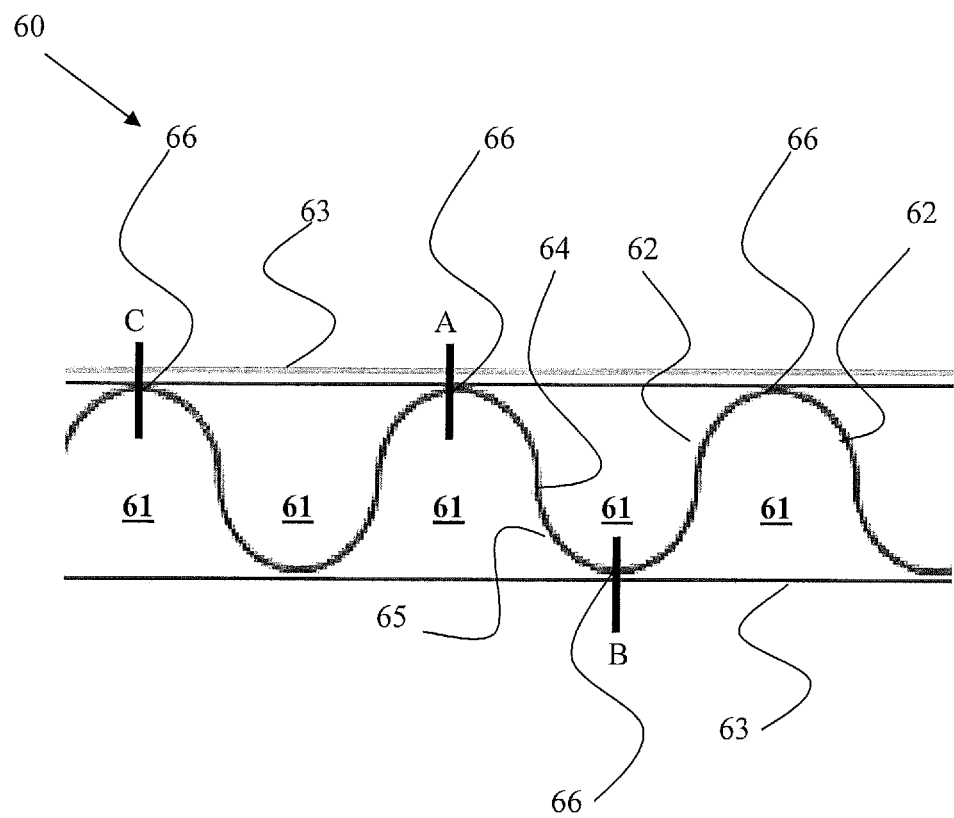
FIG. 6 illustrates a cross-section of a portion of a corrugated structural catalyst body according to one embodiment described herein.

FIG. 6 illustrates a cross-section of a portion of a corrugated structural catalyst body according to one embodiment described herein. The flow channels (61) of the structural catalyst body (60) are defined by inner partition walls (62, 63). The inner partition walls (62, 63) and their junctures or intersections with one another serve as boundaries for adjacent flow channels (61). As illustrated in FIG. 6, the corrugated catalyst body (60) comprises flat inner partition walls (63) having a width as defined by the distance between A and C. The corrugated catalyst body also has curved inner partition walls (62) having a width defined by the distance between A and B. Inner partition walls (62, 63) comprise a first surface (64) and a second surface (65). The first surface (64) and/or the second surface (65) have a gradient of first catalytic material and/or second catalytic material along the width of the first surface and/or second surface as described herein. Moreover, intersection of inner partition walls (62) with one another at points A, B and C, for example, provide centerpost structures (66).

In some embodiments wherein the outer peripheral wall comprises a bulk first catalytic material, inner partition walls of a structural catalyst body comprise more bulk first catalytic material than the outer peripheral wall. In some embodiments, for example, the concentration of bulk first catalytic material at a point in an inner partition wall is about 1.1 to about 10 times greater than the concentration of bulk first catalytic material at a point in an outer peripheral wall.

In some embodiments wherein the outer peripheral wall further comprises a bulk second catalytic material, inner partition walls of a structural catalyst body comprise more bulk second catalytic material than the outer peripheral wall. In some embodiments, for example, the concentration of bulk second catalytic material at a point in an inner partition wall is about 1.1 to about 10 times greater than the concentration of bulk second catalytic material at a point in an outer peripheral wall.

In some embodiments, a structural catalyst body described herein comprises a containment structure in which the inner partition walls are disposed, such as in the arrangement of plate catalyst elements or corrugated catalyst elements in the containment structure.

As illustrated in FIG. 3, the intersection of inner partition walls (11) of the honeycomb form centerpost structures (17). In some embodiments, intersection of spacer structures and/or walls of plate catalyst elements of a structural catalyst body described herein form centerpost structures. In some embodiments, intersection walls of corrugated catalyst elements of a structural catalyst body described herein form centerpost structures.

A structural catalyst body, in some embodiments, further comprises a gradient of bulk first catalytic material between a centerpost and least one inner partition wall connected to the centerpost. In some embodiments, for example, the at least one inner partition wall comprises a greater concentration of a bulk first catalytic material than the centerpost. In some embodiments, a structural catalyst body described herein comprises a gradient of bulk first catalytic material between a centerpost and a plurality of inner partition walls connected to the centerpost. In some embodiments, each of the inner partition walls connected to the centerpost comprises a greater concentration of a bulk first catalytic material than the centerpost.

In some embodiments, the concentration of bulk first catalytic material at a point in an inner partition wall is at least 1.1 times greater or 1.3 times greater than the concentration of bulk first catalytic material at a point in the centerpost. In some embodiments, the concentration of bulk first catalytic material at a point in an inner partition wall is at least 1.5 times or at least 2 times greater than the concentration of bulk first catalytic material at a point in the centerpost. In some embodiments, the concentration of bulk first catalytic material at a point in an inner partition wall is at least 3 times or at least 3.5 times greater than the concentration of bulk first catalytic material at a point in the centerpost. In some embodiments, the concentration of bulk first catalytic material at a point in an inner partition wall is at least 4 times or at least 4.5 times greater than the concentration of bulk first catalytic material at a point in the centerpost. In some embodiments, the concentration of bulk first catalytic material at a point in an inner partition wall is at least 5 times or at least 10 times greater than the concentration of bulk first catalytic material at a point in the centerpost. In some embodiments, a concentration of bulk first catalytic material at a plurality of points in an inner partition wall is at least 1.1 times greater or 1.3 times greater than the concentration of bulk first catalytic material at one or more points in the centerpost.

In some embodiments, the concentration of bulk first catalytic material at a point in an inner partition wall is 1.3 times to 10 times greater than the concentration of bulk first catalytic material at a point in the centerpost. In some embodiments, a concentration of bulk first catalytic material at a plurality of points in an inner partition wall is 1.3 times to 10 times greater than the concentration of bulk first catalytic material at one or more points in the centerpost.

A structural catalyst body, in some embodiments, further comprises a gradient of bulk second catalytic material between a centerpost and least one inner partition wall connected to the centerpost. In some embodiments, for example, the at least one inner partition wall comprises a greater concentration of a bulk second catalytic material than the centerpost. In some embodiments, a structural catalyst body described herein comprises a gradient of bulk second catalytic material between a centerpost and a plurality of inner partition walls connected to the centerpost. In some embodiments, each of the inner partition walls connected to the centerpost comprises a greater concentration of a bulk second catalytic material than the centerpost.

In some embodiments, the concentration of bulk second catalytic material at a point in an inner partition wall is at least 1.1 times greater or 1.3 times greater than the concentration of bulk second catalytic material at a point in the centerpost. In some embodiments, the concentration of bulk second catalytic material at a point in an inner partition wall is at least 1.5 times or at least 2 times greater than the concentration of bulk second catalytic material at a point in the centerpost. In some embodiments, the concentration of bulk second catalytic material at a point in an inner partition wall is at least 3 times or at least 3.5 times greater than the concentration of bulk second catalytic material at a point in the centerpost. In some embodiments, the concentration of bulk second catalytic material at a point in an inner partition wall is at least 4 times or at least 4.5 times greater than the concentration of bulk second catalytic material at a point in the centerpost. In some embodiments, the concentration of bulk second catalytic material at a point in an inner partition wall is at least 5 times or at least 10 times greater than the concentration of bulk second catalytic material at a point in the centerpost. In some embodiments, a concentration of bulk second catalytic material at a plurality of points in an inner partition wall is at least 1.1 times greater or 1.3 times greater than the concentration of bulk second catalytic material at one or more points in the centerpost.

In some embodiments, the concentration of bulk second catalytic material at a point in an inner partition wall is 1.3 times to 10 times greater than the concentration of bulk second catalytic material at a point in the centerpost. In some embodiments, a concentration of bulk second catalytic material at a plurality of points in an inner partition wall is 1.3 times to 10 times greater than the concentration of bulk second catalytic material at one or more points in the centerpost.

Embodiments described herein contemplate structural catalyst bodies having any combination of the foregoing gradients of first catalytic material and/or second catalytic material. In some embodiments, for example, a structural catalyst described herein can have any combination of gradients of first catalytic material and/or second catalytic material as provided in Table I of FIG. 5.

In some embodiments, the outer peripheral wall and the inner partition walls of a structural catalyst body described herein are formed from a support material such as an inorganic oxide composition, including refractory metal oxide compositions. The inorganic oxide composition, in some embodiments, comprises titania ($TiO_2$), alumina ($Al_2O_3$), zirconia ($ZrO_2$), silica ($SiO_2$), silicate or mixtures thereof. In some embodiments, the chemical composition comprises an inorganic oxide composition of $TiO_2$, $Al_2O_3$, $ZrO_2$ or $SiO_2$ or mixtures thereof in an amount ranging from about 70 weight percent to 100 weight percent. In some embodiments, the inorganic oxide composition is sintered or otherwise heat treated to increase the mechanical integrity of the structural catalyst body.

In some embodiments, an outer peripheral wall and the inner partition walls of a structural catalyst body described herein are formed from a composition comprising catalytic material. In some embodiments, the outer peripheral wall and the inner partition walls of a structural catalyst body are formed of a chemical composition comprising 50-99.99% by weight an inorganic oxide composition and at least 0.01% by weight a catalytically active metal functional group. In some embodiments, the catalytically active metal functional group can comprise any of the catalytic materials described herein. In some embodiments, structural catalyst bodies comprising an outer peripheral wall and inner partition walls formed from a composition comprising catalytic material are described in U.S. Pat. Nos. 7,807,110, 7,776,786 and 7,658,898 which are hereby incorporated by reference in their entireties. In some embodiments, the catalytically active metal functional group is dispersed throughout the chemical composition. In some embodiments, the catalytically active metal functional group is dispersed uniformly or substantially uniformly throughout the chemical composition.

In some embodiments, structural catalyst bodies described herein comprise virgin structural catalyst bodies. A virgin structural catalyst body, in some embodiments, has not been used or previously installed into a catalytic reactor for conducting catalytic reactions in a fluid stream.

In some embodiments, a structural catalyst body described is used or regenerated. A used structural catalyst body, in some embodiments, has been previously installed in a catalytic reactor for conducting catalytic reactions in a fluid stream.

In some embodiments, catalytic material of gradients of structural catalyst bodies described herein comprise one or more transition metals. In some embodiments, transition metals of catalytic material comprise vanadium, tungsten, molybdenum, platinum, palladium, ruthenium, rhodium, rhenium, iron, gold, silver, copper or nickel or alloys or oxides thereof. In some embodiments, one or more catalytic materials of gradients of structural catalyst bodies described herein are suitable for SCR applications and processes. In some embodiments, for example, catalytic material comprises $V_2O_5$, $WO_3$ or $MoO_3$ or mixtures thereof.

In some embodiments, the first catalytic material described herein comprises a transition metal selected from the group consisting of vanadium, tungsten, molybdenum, platinum, palladium, ruthenium, rhodium, rhenium, iron, gold, silver, copper and nickel and alloys and oxides thereof. In some embodiments, for example, the first catalytic material is $V_2O_5$, $WO_3$ or $MoO_3$. Moreover, in some embodiments, the second catalytic material described herein comprises a transition metal selected from the group consisting of vanadium, tungsten, molybdenum, platinum, palladium, ruthenium, rhodium, rhenium, iron, gold, silver, copper and nickel and alloys and oxides thereof. In some embodiments, for example, the second catalytic material is $V_2O_5$, $WO_3$ or $MoO_3$. In some embodiments, the at least one additional catalytic material described herein comprises a transition metal selected from the group consisting of vanadium, tungsten, molybdenum, platinum, palladium, ruthenium, rhodium, rhenium, iron, gold, silver, copper and nickel and alloys and oxides thereof. In some embodiments, for example, the at least one additional catalytic material is $V_2O_5$, $WO_3$ or $MoO_3$.

Structural catalyst bodies described herein can have any dimensions and mechanical properties not inconsistent with the objectives of the present invention. In some embodiments, structural catalyst bodies have dimensions and mechanical properties suitable for use in SCR applications and processes. In some embodiments, for example, structural catalyst bodies can have one or more properties consistent with a structural catalyst body described in U.S. Pat. Nos. 7,807,110, 7,776,786 and 7,658,898. In some embodiments, structural catalyst bodies described herein comprise plate catalyst bodies or corrugated catalyst bodies. In some embodiments, a structural catalyst body described herein can comprise one or more plate catalyst element or corrugated catalyst elements.

In another aspect, a catalyst module is described herein comprising a framework and a plurality of structural catalyst bodies disposed in the framework, the structural catalyst bodies comprising a gradient of first catalytic material along a width of a surface of at least one inner partition wall as described herein, wherein the catalytic activity of the catalyst bodies of the module is substantially uniform. In being substantially uniform, catalytic activity between catalyst bodies of the module, in some embodiments, varies less than about 20%. In some embodiments, in being substantially uniform, catalytic activity between catalyst bodies of the module varies less than 10%. In some embodiments, in being substantially uniform, catalytic activity between catalyst bodies of the module varies less than 5%. In some embodiments, catalytic activity comprises the selective catalytic reduction of nitrogen oxides, the oxidation of mercury or the oxidation of ammonia or combinations thereof.

In some embodiments, sulfur dioxide oxidation activity of catalyst bodies of the module is substantially uniform. In being substantially uniform, sulfur dioxide oxidation activity between catalyst bodies of the module, in some embodiments, varies less than 40%. In some embodiments, in being substantially uniform, sulfur dioxide oxidation activity between catalyst bodies of the module varies less than 20%. In some embodiments, in being substantially uniform, sulfur dioxide oxidation activity between catalyst bodies of the module varies less than 10%.

Moreover, in some embodiments, catalyst bodies of a module comprise one or more catalytic gradients described herein in addition to a gradient of a first catalytic material along the width of a surface of at least one inner partition wall. In some embodiments, for example, catalyst bodies of the module also comprise a gradient of bulk first catalytic material along a width and/or length of at least one inner partition as described herein. In some embodiments, catalyst bodies of a module can have any combination of the gradients provided in Table I of FIG. 5.

In another aspect, at least one catalyst layer of a catalytic reactor is described herein, the catalyst layer comprising a plurality of structural catalyst bodies, the structural catalyst bodies comprising a gradient of first catalytic material along a width of a surface of at least one inner partition wall as described herein, wherein the catalytic activity of the structural catalyst bodies of the catalyst layer is substantially uniform. In being substantially uniform, in some embodiments, catalytic activity between catalyst bodies of the catalyst layer varies less than about 20%. In some embodiments, in being substantially uniform, catalytic activity between catalyst bodies of the catalyst layer varies less than about 10%. In some embodiments, in being substantially uniform, catalytic activity between catalyst bodies of the catalyst layer varies less than about 5%. In some embodiments, catalytic activity comprises the selective catalytic reduction of nitrogen oxides, the oxidation of mercury or the oxidation of ammonia or combinations thereof.

In some embodiments, sulfur dioxide oxidation activity of catalyst bodies of the catalyst layer is substantially uniform. In being substantially uniform, sulfur dioxide oxidation activity between catalyst bodies of the catalyst layer, in some embodiments, varies less than 40%. In some embodiments, in being substantially uniform, sulfur dioxide oxidation activity between catalyst bodies of the catalyst layer varies less than 20%. In some embodiments, in being substantially uniform, sulfur dioxide oxidation activity between catalyst bodies of the catalyst layer varies less than 10%.

In some embodiments, catalyst bodies of a catalyst layer comprise one or more catalytic gradients described herein in addition to the gradient of first catalytic material along the width of a surface of at least one inner partition wall. In some embodiments, for example, catalyst bodies of a catalyst layer also comprise a gradient of bulk first catalytic material along a width and/or length of at least one inner partition as described herein. In some embodiments, catalyst bodies of a catalyst layer can have any combination of the gradients provided in Table I of FIG. 5.

In some embodiments, catalyst bodies of a catalyst layer are arranged into one or more modules.

In another aspect, methods of producing structural catalyst bodies described herein are provided. In some embodiments, a method of producing a structural catalyst body comprises providing a catalyst support comprising at least one inner partition wall comprising a first surface and a second surface opposite the first surface, impregnating the at least one inner partition wall with a solution comprising a first catalytic material and drying the at least one inner partition wall in a manner to establish a gradient of the first catalytic material along a width of the first surface. In some embodiments, the first catalytic material of the gradient decreases in amount at the periphery of the width of the first surface. In some embodiments, the first catalytic material of the gradient increases in amount along a central region of the width of the first surface.

In some embodiments, a gradient of the first catalytic material is also established along a width of the second surface. In some embodiments, the first catalytic material of the gradient decreases in amount at the periphery of the width of the second surface. The first catalytic material of the gradient, in some embodiments, increases in amount along a central region of the width of the second surface. In some embodiments, the gradient profile of the first catalytic material along the width of the second surface is symmetrical or substantially symmetrical to the gradient profile of the first catalytic material along the width of the first surface.

In some embodiments, the at least one inner partition wall of the structural catalyst support is dried in a manner to establish a gradient of bulk first catalytic material along a width of the inner partition wall. In some embodiments, bulk first catalytic material of the gradient decreases in concentration at the periphery of the width of the inner partition wall. In some embodiments, bulk first catalytic material increases in concentration along a central region of the width of the inner partition wall. In some embodiments, a gradient of a bulk first catalytic material along the width of the inner partition wall has a profile symmetrical or substantially symmetrical about the midpoint of the profile.

In some embodiments, the at least one inner partition wall of the structural catalyst support is dried in a manner to establish a gradient of the first catalyst material along a length of the first surface of the inner partition wall. A gradient of the first catalytic material along the length of a first surface of the inner partition wall, in some embodiments, comprises a greater amount of the first catalytic material at a first end of the inner partition wall in comparison with an amount of the first catalytic material at a second end of the inner partition wall, the second end opposite the first end.

In some embodiments, a gradient of the first catalytic material is also established along a length of the second surface of the inner partition wall. A gradient of the first catalytic material along the length of the second surface of the inner partition wall, in some embodiments, comprises a greater amount of the first catalytic material at a first end of the inner partition wall in comparison with an amount of the first catalytic material at a second end of the inner partition wall, the second end opposite the first end. In some embodiments, the gradient profile of the first catalytic material along the length of the second surface of the inner partition wall is symmetrical or substantially symmetrical to the gradient profile of the first catalytic material along the length of the first surface of the inner partition wall.

In some embodiments, the first end of the inner partition wall corresponds to the fluid stream inlet side of the structural catalyst body and the second end corresponds to the fluid stream outlet side of the structural catalyst body. Alternatively, in some embodiments, the first end of the inner partition wall corresponds to the outlet side of the structural catalyst body, and the second end corresponds to the fluid stream inlet side.

In some embodiments, the at least one inner partition wall of a structural catalyst body described herein is dried in a manner to establish a gradient of a bulk first catalytic material along a length of the inner partition wall. In some embodiments, a gradient of a first bulk catalytic material along a length of the inner partition wall comprises a greater concentration of the bulk first catalytic material at a first end of the inner partition wall in comparison with a concentration of the bulk first catalytic material at a second end of the inner partition wall, the second end opposite the first end.

In some embodiments of methods described herein, the structural catalyst body comprises a plurality of inner partition walls such that the inner partition walls are impregnated with a solution comprising the first catalytic material and dried in a manner to establish a gradient of the of the first catalytic material along a width and/or length of one or more surfaces of the inner partition walls. In some embodiments, the inner partition walls are dried in a manner to establish a gradient of a bulk first catalytic material along a width and/or length of the inner partition walls.

In some embodiments, inner partition walls of a structural catalyst body produced according to methods described herein intersect to form one or more centerposts. In some embodiments, at least one centerpost is impregnated with a solution comprising the first catalytic material and dried in a manner to establish a gradient of bulk first catalytic material between the centerpost and at least one of the inner partition walls. In some embodiments, for example, at least one inner partition wall comprises a greater concentration of bulk first catalytic material than the centerpost. In some embodiments, each of the inner partition walls connected to the centerpost comprises a greater concentration of bulk first catalytic material than the centerpost.

In some embodiments of methods described herein, the impregnating solution further comprises a second catalytic material. In some embodiments, a gradient of bulk metal or metal oxide second catalytic material is established along a width of the inner partition wall. Alternatively, in some embodiments, at least one inner partition wall of a structural catalyst body comprising one or more gradients of the first catalytic material described herein is further impregnated with a solution comprising a metal or metal oxide second catalytic material and dried in a manner to establish a gradient of the metal or metal oxide second catalytic material along a width of the first surface and/or second surface of the inner partition wall. In some embodiments, a gradient of bulk metal or metal oxide second catalytic material is established along a width of the inner partition wall.

In some embodiments, the second catalytic material of the gradient decreases in amount at the periphery of the width of the first surface. In some embodiments, the second catalytic material of the gradient increases in amount along a central region of the width of the first surface.

In some embodiments, a gradient of the second catalytic material is also established along a width of the second surface of the inner partition wall. In some embodiments, the second catalytic material of the gradient decreases in amount at the periphery of the width of the second surface. The second catalytic material of the gradient, in some embodiments, increases in amount along a central region of the width of the second surface. In some embodiments, the gradient profile of the second catalytic material along the width of the second surface is symmetrical or substantially symmetrical to the gradient profile of the second catalytic material along the width of the first surface.

In some embodiments, a gradient of the second catalytic material is also established along a length of the first surface of the inner partition wall. A gradient of the second catalytic material along a first surface of the inner partition wall, in some embodiments, comprises a greater amount of the second catalytic material at a first end of the inner partition wall in comparison with an amount of the second catalytic material at a second end of the inner partition wall, the second end opposite the first end.

In some embodiments, a gradient of the second catalytic material is also established along a length of the second surface of the inner partition wall. A gradient of the second catalytic material along the length of the second surface of the inner partition wall, in some embodiments, comprises a greater amount of the second catalytic material at a first end of the inner partition wall in comparison with an amount of the second catalytic material at a second end of the inner partition wall, the second end opposite the first end. In some embodiments, the gradient profile of the second catalytic material along the length of the second surface of the inner partition wall is symmetrical or substantially symmetrical to the gradient profile of the second catalytic material along the length of the first surface of the inner partition wall.

In some embodiments, a gradient of bulk second catalytic material is also established along a width of the inner partition wall. In some embodiments, bulk second catalytic material of the gradient decreases in concentration at the periphery of the width of the inner partition wall. In some embodiments, bulk second catalytic material increases in concentration along a central region of the width of the inner partition wall. In some embodiments, a gradient of bulk second catalytic material along the width of the inner partition wall has a profile symmetrical or substantially symmetrical about the midpoint of the profile.

In some embodiments, drying the at least one inner partition wall of a structural catalyst body described herein also establishes a gradient of a bulk second catalytic material along a length of the inner partition wall. In some embodiments, a gradient of a bulk second catalytic material along a length of the inner partition wall comprises a greater concentration of the bulk second catalytic material at a first end of the inner partition wall in comparison with a concentration of the bulk second catalytic material at a second end of the inner partition wall, the second end opposite the first end.

Moreover, in some embodiments of methods described herein, a gradient of the second catalytic material is also established along a width and/or length of one or more surfaces of a plurality of inner partition walls of the structural catalyst body. In some embodiments, a gradient of bulk second catalytic material is also established along a width and/or length of a plurality of inner partition walls of the structural catalyst body.

In some embodiments, at least one centerpost of a structural catalyst body is impregnated with the solution further comprising the second catalytic material, and drying the structural catalyst body also establishes a gradient of bulk second catalytic material between the centerpost and at least one of the inner partition walls forming the centerpost. In some embodiments, for example, at least one inner partition wall comprises a greater concentration of bulk second catalytic material than the centerpost. In some embodiments, each of the inner partition walls forming the centerpost comprises a greater concentration of bulk second catalytic material than the centerpost.

Additionally, in some embodiments, the outer peripheral wall of a structural catalyst body described herein is impregnated with the second catalytic material. In some embodiments wherein the outer peripheral wall comprises bulk second catalytic material, inner partition walls of the structural catalyst body comprise a greater concentration of bulk second catalytic material than the outer peripheral wall.

In some embodiments, first and/or second catalytic material of gradients of structural catalyst bodies produced according to methods described herein comprise one or more transition metals. In some embodiments, transition metals of the first and/or second catalytic material comprise vanadium, tungsten, molybdenum, platinum, palladium, ruthenium, rhodium, rhenium, iron, gold, silver, copper or nickel or alloys or oxides thereof. In some embodiments, the first and/or second catalytic material of gradients of structural catalyst bodies described herein are suitable for SCR applications and processes. In some embodiments, for example, the first and/or second catalytic material comprise $V_2O_5$, $WO_3$ or $MoO_3$ or mixtures thereof. In some embodiments, the first and/or second catalytic material comprise one or more precursors for forming a catalytic material suitable for SCR applications. In some embodiments, for example, the first and/or second catalytic material comprise one or more precursors for forming $V_2O_5$, $WO_3$ or $MoO_3$ or mixtures thereof.

In some embodiments, drying inner partition walls and/or centerposts of a structural catalyst support comprises flowing a gas over surfaces of the inner partition walls and/or centerposts at a rate and/or temperature sufficient to establish one or more gradients of the first catalytic material and/or second catalytic material described herein. Flowing a gas over surfaces of the inner partition walls and/or centerposts to establish one or more gradients of the first catalytic material and/or second catalytic material described herein can be administered in any manner not inconsistent with the objectives of the present invention. In some embodiments, gas is flowed over all or substantially all of the inner partition walls and/or centerposts of a structural catalyst support in an even or substantially even manner.

Additionally, in some embodiments, the impregnation solution of a method described herein further comprises at least one additional catalytic material. In such embodiments, drying the structural catalyst body can provide one or more gradients of the additional catalytic material having a construction and/or location on the structural catalyst body consistent with any gradient of the first and/or second catalytic material described herein.

In some embodiments, a structural catalyst support is virgin. A virgin structural catalyst support, in some embodiments, has not been used or previously installed into a catalytic reactor for conducting catalytic reactions in a fluid stream.

In some embodiments, a structural catalyst support is used. A used structural catalyst support, in some embodiments, has been previously installed in a catalytic reactor for conducting catalytic reactions in a fluid stream. In some embodiments, a used catalyst support is part of a structural catalyst body in need of regeneration.

In some embodiments, virgin or used structural catalyst supports comprise honeycomb-like structural supports, plate structural supports or corrugated structural supports.

In some embodiments of methods described herein, structural catalyst supports comprising a plurality of inner partition walls are arranged in the framework of a catalyst module. In such embodiments, the catalyst module comprising the structural catalyst supports can be immersed in the solution of catalytic material to impregnate the inner partition walls and/or centerposts of the structural catalyst supports with catalytic material.

In some embodiments, the structural catalyst supports impregnated with a solution of the first catalytic material are dried while remaining the framework of the catalyst module to establish one or more gradients of the first catalytic material described herein. In some embodiments, the impregnation solution further comprises a second catalytic material wherein drying the structural catalyst supports while remaining in the framework of the catalyst module also establishes one or more gradients of the second catalytic material as described herein. In some embodiments, for example, a gas is flowed through the module and over surfaces of the inner partition walls and/or centerposts of the structural catalyst supports at a rate and/or temperature sufficient to establish one or more gradients of the first and/or second catalytic material described herein. In some embodiments, the gas is flowed evenly or substantially evenly through the structural catalyst supports arranged in the framework of the module such that the catalytic activity of the resulting structural catalyst bodies is substantially uniform across the module. In being substantially uniform, catalytic activity between catalyst bodies in the module, in some embodiments, varies less than about 20%. In some embodiments, in being substantially uniform, catalytic activity between catalyst bodies of the module varies less than 10%. In some embodiments, in being substantially uniform, catalytic activity between catalyst bodies of the module varies less than 5%. In some embodiments, catalytic activity comprises the selective catalytic reduction of nitrogen oxides, the oxidation of mercury or the oxidation of ammonia or combinations thereof.

In some embodiments, sulfur dioxide oxidation activity of catalyst bodies of the module is substantially uniform across the module. In being substantially uniform, sulfur dioxide oxidation activity between catalyst bodies of the module, in some embodiments, varies less than 40%. In some embodiments, in being substantially uniform, sulfur dioxide oxidation activity between catalyst bodies of the module varies less than 20%. In some embodiments, in being substantially uniform, sulfur dioxide oxidation activity between catalyst bodies of the module varies less than 10%.

In some embodiments, gradients of first and/or second catalytic material produced according to the forgoing methods can have any of the structural and/or compositional properties described herein for the gradients of the first and/or second catalytic material. In some embodiments, for example, a structural catalyst produced according to one or more methods described herein can have any combination of gradients of first catalytic material and/or second catalytic material as provided in Table I of FIG. 5.

In some embodiments of methods described herein, a structural catalyst support is immersed or dipped into a solution of catalytic material to impregnate the inner partition walls and/or centerposts with the solution of catalytic material. In some embodiments, catalytic material of the solution comprises one or more transition metals. In some embodiments, transition metals comprise vanadium, tungsten, molybdenum, platinum, palladium, ruthenium, rhodium, rhenium, iron, gold, silver, copper or nickel or alloys or oxides thereof. In some embodiments, one or more catalytic materials of gradients of structural catalyst bodies described herein are suitable for SCR applications and processes. In some embodiments, for example, catalytic material comprises $V_2O_5$, $WO_3$ or $MoO_3$ or mixtures thereof.

In some embodiments, the first catalytic material of a solution described herein comprises a transition metal selected from the group consisting of vanadium, tungsten, molybdenum, platinum, palladium, ruthenium, rhodium, rhenium, iron, gold, silver, copper and nickel and alloys and oxides thereof. Moreover, in some embodiments, the second catalytic material of a solution described herein comprises a transition metal selected from the group consisting of vanadium, tungsten, molybdenum, platinum, palladium, ruthenium, rhodium, rhenium, iron, gold, silver, copper and nickel and alloys and oxides thereof. In some embodiments, the at least one additional catalytic material of a solution described herein comprises a transition metal selected from the group consisting of vanadium, tungsten, molybdenum, platinum, palladium, ruthenium, rhodium, rhenium, iron, gold, silver, copper and nickel and alloys and oxides thereof.

In some embodiments, for example, an aqueous solution comprises first catalytic material of a vanadium salt, such as vanadyl salts, including vanadyl oxalate, vanadyl sulfate or ammonium metavanadate or mixtures thereof. In some embodiments, the aqueous solution further comprises a second catalytic material of a tungsten salt, such as tungstate salts, including ammonium metatungstate. In some embodiments, the aqueous solution further comprises at least one additional catalytic material of a molybdenum salt, such as ammonium molybdate, sodium molybdate or mixtures thereof.

A catalytic material can be present in a solution for impregnating the catalyst support in any amount not inconsistent with the objectives of the present invention.

In some embodiments, a structural catalyst support is immersed in a solution of the first, second and/or additional catalytic material for any desired amount of time not inconsistent with the objectives of the present invention. In some embodiments, a structural catalyst support is immersed in a solution of catalytic material for a time period of at least about 5 seconds. In some embodiments, a structural catalyst support is immersed in a solution of catalytic material for a time period of at least about 10 seconds or at least about 30 seconds. In some embodiments, a structural catalyst support is immersed in a solution of catalytic material for a time period of at least about 1 minute. In some embodiments, a structural catalyst support is immersed in a solution of catalytic material for a time period of at least about 5 minutes or at least about 10 minutes. A structural catalyst support, in some embodiments, is immersed in a solution of catalytic material for a time period ranging from about 1 minute to about 15 minutes.

In some embodiments, pore surfaces and/or other surfaces of a structural catalyst support are not treated with a blocking fluid or other agent having the ability to inhibit or facilitate impregnation of the solution of catalytic material into the inner partition walls and/or centerposts prior or subsequent to immersing the structural catalyst body in the solution of catalytic material.

In some embodiments, a structural catalyst support is fully immersed in the solution of catalytic material. In some embodiments, a catalyst support is only partially immersed in the solution of catalytic material.

Moreover, in some embodiments of methods described herein, structural catalyst supports comprising a plurality of inner partition walls are arranged in the framework of a catalyst module. In such embodiments, the catalyst module comprising the structural catalyst supports can be immersed in the solution of the first, second and/or additional catalytic material to impregnate the inner partition walls and/or centerposts of the structural catalyst supports with catalytic material.

Inner partition walls and/or centerposts of a structural catalyst support are dried to establish one or more gradients of the first, second and/or additional catalytic material described herein. In some embodiments, drying inner partition walls and/or centerposts of a structural catalyst support comprises flowing a gas over surfaces of the inner partition walls and/or centerposts at a rate and/or temperature sufficient to establish one or more of the gradients of catalytic material described herein.

A gas flowed over surfaces of the inner partition walls and/or centerposts of a structural catalyst support during the drying process can have any desired flow rate consistent with establishing one or more gradients of catalytic material described herein. In some embodiments, a gas has a flow rate according to any of the ranges set forth in Table I.

TABLE I

| Drying Gas Flow Rate (m/s) |
| --- |
| 0.1-1 |
| 1-2 |
| 2-3 |
| 3-4 |
| 4-5 |
| 5-6 |
| 6-7 |
| 7-8 |
| 8-9 |
| 9-10 |
| >10 |

Moreover, a gas flowed over surfaces of the inner partition walls and/or centerposts of a structural catalyst support during the drying process can have any desired temperature consistent with establishing one or more gradients of catalytic material described herein. The gas, in some embodiments, is heated to a temperature of at least about 140° C. In some embodiments, the gas is heated to a temperature of at least about 160° C. In some embodiments, the gas is heated to a temperature ranging from about 100° C. to about 350° C. In some embodiments, the gas is heated to a temperature greater than 350° C.

In some embodiments, the flow rate of the gas and the temperature of the gas can be mutually or independently adjusted to produce gradients of catalytic material of varying degree along widths of inner partition walls of a structural catalyst support in the production of a structural catalyst body.

A gas suitable for flowing over surfaces of one or more inner partition walls can comprise any gas not inconsistent with establishing one or more gradients of catalytic material described herein. In some embodiments, a gas comprises air. In some embodiments, a gas comprises nitrogen or argon. In some embodiments, a gas comprises combustion flue gas. In some embodiments, a structural catalyst body described herein is calcined after establishing one or more gradients of catalytic material.

Inner partition walls and/or centerposts of a structural catalyst support can be exposed to the flowing gas for any desired time period consistent with establishing one or more gradients of catalytic material described herein. In some embodiments, inner partition walls and/or centerposts are exposed to the flowing gas for a time period ranging from about 1 minute to about 1.5 hours. In some embodiments, inner partition walls and/or centerposts are exposed to the flowing gas for a time period ranging from about 5 minutes to about 45 minutes. In some embodiments, inner partition walls and/or centerposts are exposed to the flowing gas for a time period ranging from about 10 minutes to about 30 minutes.

Flowing a gas over surfaces of the inner partition walls and/or centerposts to establish one or more gradients of catalytic material described herein can be administered in any manner not inconsistent with the objectives of the present invention. In some embodiments, gas is flowed over all or substantially all of the inner partition walls and/or centerposts of a structural catalyst support in an even or substantially even manner. In some embodiments, for example, a conduit is coupled to the open face of the catalyst support, and gas is flowed through the conduit and through the flow channels of the structural catalyst support, thereby flowing evenly or substantially evenly over the inner partition walls and/or centerposts. In some embodiments, the conduit is sealed to the open face of the structural catalyst support or preclude or inhibit air flow along exterior surfaces of the structural catalyst support.

In some embodiments, a diffuser is positioned in front of the open face of the catalyst support to assist in providing an even or substantially even flow of the gas through the structural catalyst body during the drying process. In some embodiments, a diffuser can comprise a perforated plate. Additionally, in some embodiments, a diffuser can be used alone or in conjunction with a conduit.

In some embodiments, the structural catalyst supports impregnated with a solution of the first, second and/or additional catalytic material are dried while remaining the framework of the catalyst module to establish one or more gradients of catalytic material described herein. In some embodiments, for example, a gas is flowed through the module and over surfaces of the inner partition walls and/or centerposts of the structural catalyst supports at a rate and/or temperature sufficient to establish one or more gradients of catalytic material described herein.

In some embodiments, the gas is flowed evenly or substantially evenly through the structural catalyst supports arranged in the framework of the module such that the catalytic activity of the resulting structural catalyst bodies is substantially uniform across the module. In being substantially uniform, catalytic activity between catalyst bodies in the module, in some embodiments, varies less than about 20%. In some embodiments, in being substantially uniform, catalytic activity between catalyst bodies of the module varies less than 10%. In some embodiments, in being substantially uniform, catalytic activity between catalyst bodies of the module varies less than 5%. In some embodiments, catalytic activity comprises the selective catalytic reduction of nitrogen oxides, the oxidation of mercury or the oxidation of ammonia or combinations thereof.

In some embodiments, sulfur dioxide oxidation activity of catalyst bodies of the module is substantially uniform across the module. In being substantially uniform, sulfur dioxide oxidation activity between catalyst bodies of the module, in some embodiments, varies less than 40%. In some embodiments, in being substantially uniform, sulfur dioxide oxidation activity between catalyst bodies of the module varies less than 20%. In some embodiments, in being substantially uniform, sulfur dioxide oxidation activity between catalyst bodies of the module varies less than 10%.

In some embodiments, a conduit is coupled to the open face of the module and gas is flowed through the conduit and through the structural catalyst supports in the module. In some embodiments, the conduit is sealed to the open face of the module to preclude or inhibit air flow along exterior surfaces of the module.

In some embodiments, a diffuser is positioned in front of the open face of the catalyst module to assist in providing an even or substantially even flow of the gas through the structural catalyst body during the drying process. In some embodiments, a diffuser can comprise a perforated plate. Additionally, in some embodiments, a diffuser can be used alone or in conjunction with a conduit.

In another aspect, methods of treating a fluid stream, such as a flue gas or combustion gas stream are described herein. In some embodiments, a method of treating a fluid stream comprises providing a structural catalyst body comprising at least one inner partition wall comprising a first surface and a second surface opposite the first surface, the inner partition wall having a gradient of first catalytic material along a width of the first surface, passing the fluid stream through the structural catalyst body and catalytically reacting at least one chemical species in the fluid stream. In some embodiments, the fluid stream is flowed through one or more flow channels of the structural catalyst body.

In some embodiments, catalytically reacting at least one chemical species in the fluid stream comprises catalytically reducing nitrogen oxides in the fluid stream. In some embodiments, catalytically reacting at least one chemical species in the fluid stream comprises oxidizing ammonia and/or mercury in the fluid stream.

In some embodiments of methods of treating a fluid stream, oxidation of sulfur dioxide to sulfur trioxide in the fluid stream is reduced. In one embodiment, for example, oxidation of sulfur dioxide is reduced during the selective catalytic reduction of nitrogen oxides in a fluid stream by a structural catalyst body described herein.

In some embodiments, catalyst bodies of a method of treating a fluid stream comprise one or more catalytic gradients described herein in addition to the gradient of first catalytic material along the width of a surface of at least one inner partition wall. In some embodiments, for example, catalyst bodies also comprise a gradient of bulk first catalytic material along a width and/or length of at least one inner partition as described herein. In some embodiments, catalyst bodies of methods described herein can have any combination of the gradients provided in Table I of FIG. 5.

In some embodiments, the catalyst body is part of a module comprising a plurality of catalyst bodies described herein, where the fluid stream is passed into the module and through the catalyst bodies. In some embodiments, the module is part of a catalytic layer of a catalytic reactor.

These and other embodiments of structural catalyst bodies are further illustrated by the following non-limiting example.

EXAMPLE 1

Structural Catalyst Body

An extrusion composition was provided by mixing $TiO_2$ powders with fillers, binders, extrusion aids and lubricants. The extrusion composition contained substantially no vanadium (<0.10% $V_2O_5$). The extrusion composition included a tungsten content of ≤1.80% $WO_3$. The extrusion composition was extruded to provide a structural catalyst support comprising an outer peripheral wall and a plurality of inner partition walls. The inner partition walls defined a plurality of flow channels of the structural catalyst support, the flow channels having a square cross-sectional profile. The extruded catalyst support was dried and calcined. Porosity of the structural catalyst support was determined by a water absorption test.

A solution of a vanadium first catalytic material and a tungsten second catalytic material was provided by adding vanadyl oxalate solution and ammonium metatungstate powder to a container of deionized water. As understood by one of skill in the art, the amounts of vanadyl oxalate and ammonium metatungstate added were determined according to the desired bulk chemistry and porosity of the structural catalyst support. Solution concentration of catalytic material was confirmed by x-ray fluorescence (XRF). The structural catalyst body was immersed in the catalytic material solution for three minutes and subsequently removed.

The structural catalyst support impregnated with vanadium first catalytic material and tungsten second catalytic material was dried with a hot air blower. The structural catalyst body was wrapped and sealed in a manner such that heated air received from the blower flowed through the flow channels and over the inner partition walls in a substantially even manner. As described herein, a conduit can be sealed to the face of the structural catalyst body for delivery of the heated air. The air from the blower was heated at a rate of 20° C./min to a set point temperature of 160° C. and held for 30 minutes to dry the structural catalyst body. The temperature of the air was then increased to 350° C. at a rate of 20° C./min to administer a 15 minute calcination of the structural catalyst body. The resulting structural catalyst body demonstrated a gradient of first ($V_2O_5$) and second ($WO_3$) catalytic materials consistent with that illustrated in FIG. 1.

Figure 4:
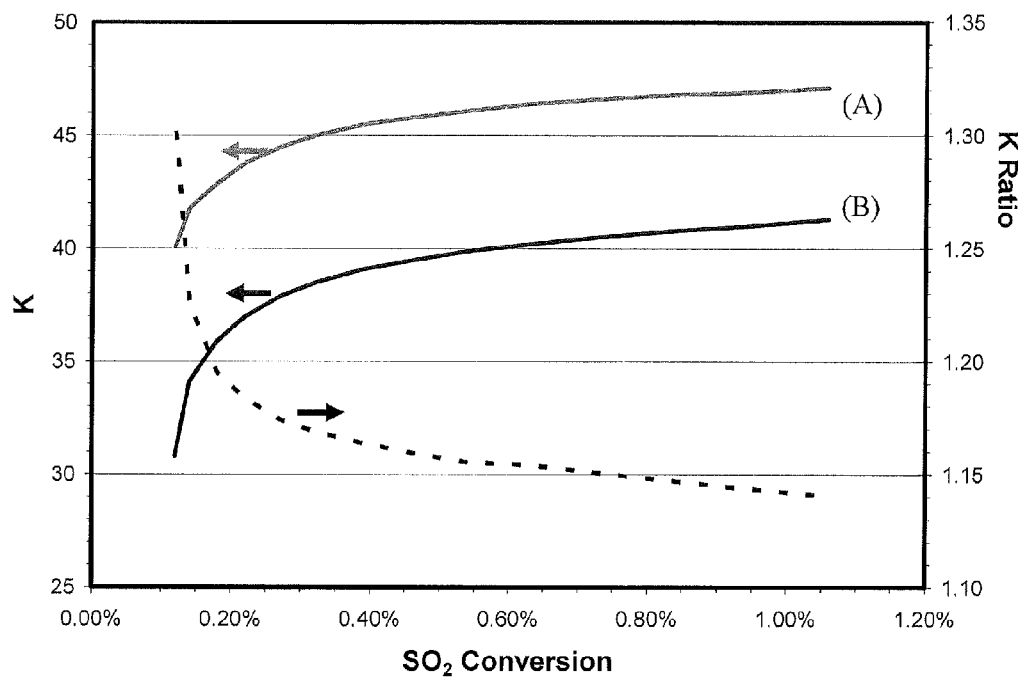
FIG. 4 illustrates catalytic activity testing of a structural catalyst body according to one embodiment described herein in comparison to a prior structural catalyst body.

Moreover, the catalytic activity of structural catalyst bodies produced in accordance with this example for the selective catalytic reduction of nitrogen oxides and sulfur dioxide oxidation was measured. The catalytic activity of the structural catalyst bodies was compared to a prior structural catalyst bodies lacking gradients of first and second catalytic material along widths of the inner partition walls. FIG. 4 illustrates the results of the catalytic activity testing. As illustrated in FIG. 4, the structural catalyst bodies of the present example (A) demonstrated significantly higher rate for the selective reduction of nitrogen oxides per unit of sulfur dioxide oxidation in comparison to the prior catalyst bodies (B).

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A structural catalyst body comprising:
a plurality of inner partition walls having a first surface and a second surface opposite the first surface and defining a plurality of individual flow channels, wherein greater than 50 percent of the inner partition walls of the individual flow channels have a gradient of first catalytic material along a width of the first surface, the first catalytic material of the gradient increasing in amount along a central region of the width of the first surface.

2. The structural catalyst body of claim 1, wherein the first catalytic material of the gradient decreases in amount at the periphery of the width of the first surface.

3. The structural catalyst body of claim 1, wherein the gradient of the first catalytic material has a profile substantially symmetrical about a midpoint of the profile.

4. The structural catalyst body of claim 1, wherein the amount of the first catalytic material at a point in the central region of the width of the first surface is at least 1.3 times greater than an amount of the first catalytic material at a peripheral point of the width of the first surface.

5. The structural catalyst body of claim 1, wherein the amount of the first catalytic material at a point in the central region of the width of the first surface is at least 2 times greater than an amount of the first catalytic material at a peripheral point of the width of the first surface.

6. The structural catalyst body of claim 1, wherein greater than 50 percent of the inner partition walls of the individual flow channels of the structural catalyst body further comprise a gradient of the first catalytic material along a width of the second surface.

7. The structural catalyst body of claim 6, wherein the first catalytic material of the gradient decreases in amount at the periphery of the width of the second surface.

8. The structural catalyst body of claim 6, wherein the first catalytic material of the gradient increases in amount along a central region of the width of the second surface.

9. The structural catalyst body of claim 6, wherein the gradient of the first catalytic material along the second surface is substantially symmetrical to the gradient of the first catalytic material along the first surface.

10. The structural catalyst body of claim 1 further comprising a gradient of a second catalytic material along the width of the first surface.

11. The structural catalyst body of claim 10, wherein the second catalytic material of the gradient decreases in amount at the periphery of the width of the first surface.

12. The structural catalyst body of claim 10, wherein the second catalytic material of the gradient increases in amount along a central region of the width of the first surface.

13. The structural catalyst body of claim 12, wherein the amount of the second catalytic material at a point in the central region of the width of the first surface is at least 1.3 times greater than an amount of the second catalytic material at a peripheral point of the width of the first surface.

14. The structural catalyst body of claim 10, wherein greater than 50 percent of the inner partition walls of the individual flow channels of the structural catalyst body further comprise a gradient of the second catalytic material along a width of the second surface.

15. The structural catalyst body of claim 14, wherein the second catalytic material of the gradient increases in amount along a central region of the width of the second surface.

16. The structural catalyst body of claim 15, wherein the amount of the second catalytic material at a point in the central region of the width of the second surface is at least 1.3 times greater than an amount of the second catalytic material at a peripheral point of the width of the second surface.

17. The structural catalyst body of claim 10, wherein the second catalytic material is operable for the selective catalytic reduction of nitrogen oxides.

18. The structural catalyst body of claim 10, wherein the second catalytic material is selected from the group consisting of $V_2O_5$, $WO_3$, $MoO_3$ and Ru.

19. The structural catalyst body of claim 1 further comprising a gradient of the first catalytic material along a length of the first surface, wherein a greater amount of the first catalytic material is present at a first end of the structural catalyst body in comparison with an amount of the first catalytic material at a second end of the structural catalyst body, the second end opposite the first end.

20. The structural catalyst body of claim 19, wherein the first end corresponds to the fluid stream inlet side of the structural catalyst body.

21. The structural catalyst body of claim 19 further comprising a gradient of a second catalytic material along the length of the first surface, wherein a greater amount of the second catalytic material is present at the first end of the structural catalyst body in comparison with an amount of the second catalytic material at the second end of the structural catalyst body.

22. The structural catalyst body of claim 19 further comprising a gradient of the first catalytic material along the length of the second surface, wherein a greater amount of the first catalytic material is present at the first end of the structural catalyst body in comparison with an amount of the first catalytic material at the second end of the structural catalyst body.

23. The structural catalyst body of claim 22 further comprising a gradient of a second catalytic material along the length of the second surface, wherein a greater amount of the second catalytic material is present at the first end of the structural catalyst body in comparison with an amount of the second catalytic material at a second end of the structural catalyst body.

24. The structural catalyst body of claim 1, wherein greater than 90 percent of the inner partition walls of the structural catalyst body comprise the gradient of the first catalytic material along a width of the first surface.

25. The structural catalyst body of claim 1, wherein the first catalytic material is operable for the selective catalytic reduction of nitrogen oxides.

26. The structural catalyst body of claim 1, wherein the first catalytic material is selected from the group consisting of $V_2O_5$, $WO_3$, $MoO_3$ and Ru.

27. A catalyst module comprising:
a framework; and
a plurality of structural catalyst bodies disposed in the framework, the structural catalyst bodies comprising a plurality of inner partition walls having a first surface and a second surface opposite the first surface and defining a plurality of individual flow channels, wherein greater than 50 percent of the inner partition walls comprise a gradient of a first catalytic material along a width of the first surface of the inner partition walls of the individual flow channels, the first catalytic material increasing in amount along a central region of the width of the first surface wherein the amount of the first catalytic material at a point in the central region is at least 1.3 times greater than an amount of the first catalytic material at a peripheral point of the width of the first surface.

28. The catalyst module of claim 27, wherein the inner partition walls further comprise a gradient of a second catalytic material along the width of the first surface.

29. The catalyst module of claim 27, wherein the catalytic activity between the catalyst bodies is substantially uniform.

30. The catalyst module of claim 27, wherein catalytic activity between the catalyst bodies of the module varies less than 10%.

31. The catalyst module of claim 27, wherein sulfur dioxide activity between catalyst bodies of the module is substantially uniform.

32. The catalyst module of claim 27, wherein sulfur dioxide activity between the catalyst bodies of the module varies less than 20%.

33. A catalyst layer comprising:
a plurality of structural catalyst bodies, the structural catalyst bodies comprising a plurality of inner partition walls having a first surface and a second surface opposite the first surface and defining a plurality of individual flow channels, wherein greater than 50 percent of the inner partition walls comprise a gradient of a first catalytic material along a width of the first surface of the inner partition walls of the individual flow channels, the first catalytic material increasing in amount along a central region of the width of the first surface wherein the amount of the first catalytic material at a point in the central region is at least 1.3 times greater than an amount of the first catalytic material at a peripheral point of the width of the first surface.

34. The catalyst layer of claim 33, wherein greater than 50% of the inner partition walls of the structural catalyst bodies comprise the gradient of the first catalytic material.

35. The catalyst layer of claim 33, wherein the inner partition walls further comprise a gradient of a second catalytic material along the width of the first surface.

36. The catalyst layer of claim 33, wherein the catalytic activity between the catalyst bodies is substantially uniform.

37. The catalyst layer of claim 33, wherein catalytic activity between the catalyst bodies of the layer varies less than 10%.

38. The catalyst layer of claim 33, wherein sulfur dioxide activity between catalyst bodies of the layer is substantially uniform.

39. The catalyst module of claim 33, wherein sulfur dioxide activity between the catalyst bodies of the catalyst layer varies less than 20%.

40. A structural catalyst body comprising:
a plurality of inner partition walls comprising a first surface and a second surface opposite the first surface and defining a plurality of individual flow channels, wherein at least 50% of the inner partition walls comprise:
a gradient of a first catalytic material along a width of a first surface of the inner partition walls of the individual flow channels, the first catalytic material increasing in amount along a central region of the width of the first surface wherein the amount of the first catalytic material at a point in the central region is at least 1.3 times greater than an amount of the first catalytic material at a peripheral point of the width of the first surface; and
a gradient of a first catalytic material along a width of the second surface of the inner partition walls of the individual flow channels, the first catalytic material increasing in amount along a central region of the width of the second surface wherein the amount of the first catalytic material at a point in the central region is at least 1.3 times greater than an amount of the first catalytic material at a peripheral point of the width of the second surface.

41. The structural catalyst body of claim 40, wherein the amount of the first catalytic material at a point in the central region is at least 2 times greater than the amount of the first catalytic material at a peripheral point of the width of the first surface.

42. A structural catalyst body comprising:
a plurality of inner partition walls comprising a first surface and a second surface opposite the first surface and defining a plurality of individual flow channels, wherein at least 50% of the inner partition walls comprise:
a gradient of a first catalytic material along a width of a first surface of the inner partition walls of the individual flow channels, the first catalytic material increasing in amount along a central region of the width of the first surface wherein the amount of the first catalytic material at a point in the central region is at least 1.3 times greater than an amount of the first catalytic material at a peripheral point of the width of the first surface; and
a gradient of a first catalytic material along a width of the second surface of the inner partition walls of the individual flow channels, the first catalytic material increasing in amount along a central region of the width of the second surface wherein the amount of the first catalytic material at a point in the central region is at least 1.3 times greater than an amount of the first catalytic material at a peripheral point of the width of the second surface;
the inner partition walls intersecting to form a plurality of centerposts, wherein at least one of the centerposts comprises a concentration of bulk first catalytic material that is at least 1.3 times less than a concentration of bulk first catalytic material of each of the inner partition walls forming the centerpost.

43. The structural catalyst body of claim 42, wherein the amount of the first catalytic material at a point in the central region is at least 2 times greater than the amount of the first catalytic material at a peripheral point of the width of the first surface.

* * * * *